United States Patent
Tanaka

(10) Patent No.: US 6,807,301 B1
(45) Date of Patent: Oct. 19, 2004

(54) IMAGE PRODUCTION CONTROLLING DEVICE, IMAGE PRODUCING DEVICE, IMAGE PRODUCTION CONTROLLING METHOD, AND A STORAGE MEDIUM

(75) Inventor: Daisuke Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 611 days.

(21) Appl. No.: 09/716,942

(22) Filed: Nov. 22, 2000

(30) Foreign Application Priority Data

Feb. 25, 2000 (JP) ........................................ 2000-048557

(51) Int. Cl.$^7$ ................................................. G06K 9/00
(52) U.S. Cl. ........................ 382/169; 382/167; 382/252; 382/274; 358/516; 358/520; 358/522
(58) Field of Search ................................ 382/169, 163, 382/170, 164, 171, 165, 172, 167, 190, 209, 217, 219, 252, 274, 275, 278, 309; 358/3.1, 3.2, 3.21, 3.22, 3.26, 3.27, 501, 509, 512, 516, 518, 519, 520–523

(56) References Cited

U.S. PATENT DOCUMENTS

| | | | | |
|---|---|---|---|---|
| 4,977,448 A | * | 12/1990 | Murata et al. ............... | 358/530 |
| 5,177,602 A | * | 1/1993 | Fujimori ..................... | 358/522 |
| 5,245,417 A | * | 9/1993 | Hibi et al. .................... | 358/515 |
| 5,278,641 A | * | 1/1994 | Sekizawa et al. ........... | 358/527 |
| 5,420,704 A | * | 5/1995 | Winkelman ................. | 358/520 |
| 5,481,372 A | * | 1/1996 | Kouno et al. ........... | 358/426.12 |
| 5,748,802 A | * | 5/1998 | Winkelman ................. | 382/271 |
| 5,790,280 A | * | 8/1998 | Terashita .................... | 358/501 |
| 5,834,762 A |  | 11/1998 | Matsuda et al. | |
| 6,067,109 A | * | 5/2000 | Yamana ...................... | 348/104 |
| 6,081,302 A | * | 6/2000 | Hanai ......................... | 348/630 |

FOREIGN PATENT DOCUMENTS

| | | | |
|---|---|---|---|
| JP | 01-196975 | 8/1989 | |
| JP | 01-213073 | 8/1989 | |
| JP | 05-183749 | 7/1993 | ............ H04N/1/40 |
| JP | 08-237485 | 9/1996 | .......... H04N/1/407 |
| JP | 10-257325 | 9/1998 | .......... H04N/1/407 |
| JP | 11-041466 | 2/1999 | .......... H04N/1/407 |

* cited by examiner

Primary Examiner—Bhavesh M. Mehta
Assistant Examiner—Yosef Kassa
(74) Attorney, Agent, or Firm—Staas & Halsey LLP

(57) ABSTRACT

When a color image is input, a histogram is generated for each primary color, and a luminance value having the highest frequency is obtained. Next, a luminance value that will become a background candidate is decided in the neighborhood of the luminance value having the highest frequency for each primary color. A value equal to or larger than the decided luminance value is defined to be a background candidate. Additionally, a background color is decided within a background candidate luminance area. By replacing the pixels within the background candidate luminance area with the decided background color, a reverse-side visible portion is removed while maintaining the appearance of the background.

32 Claims, 35 Drawing Sheets

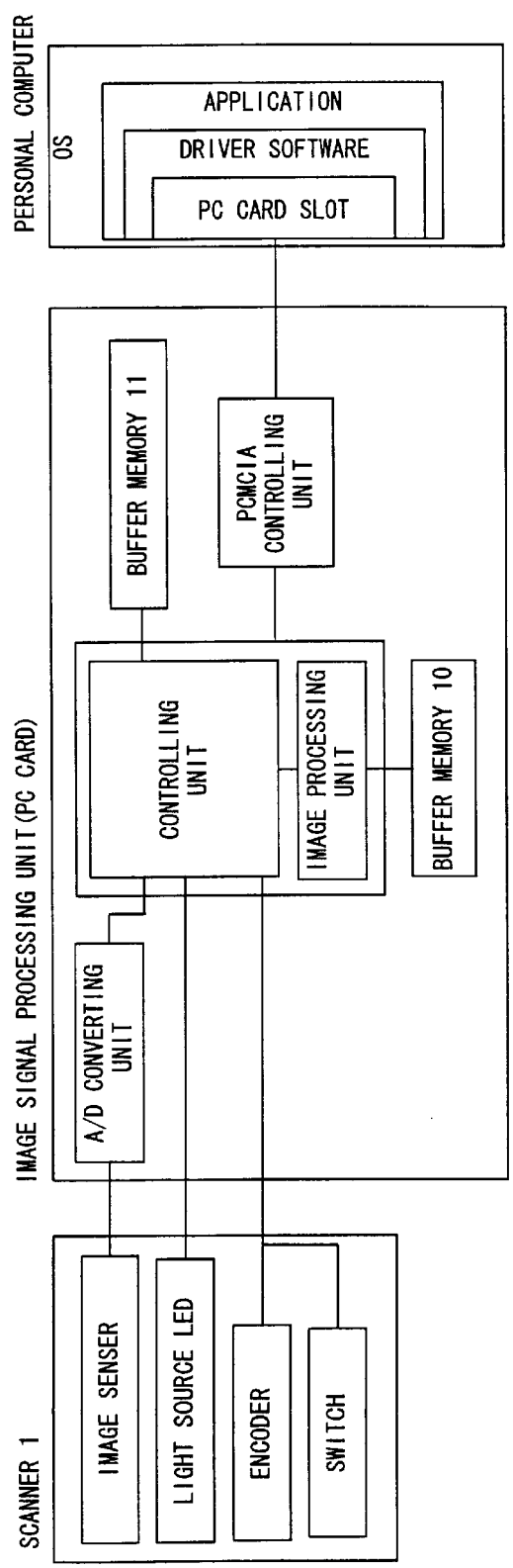
F I G. 2

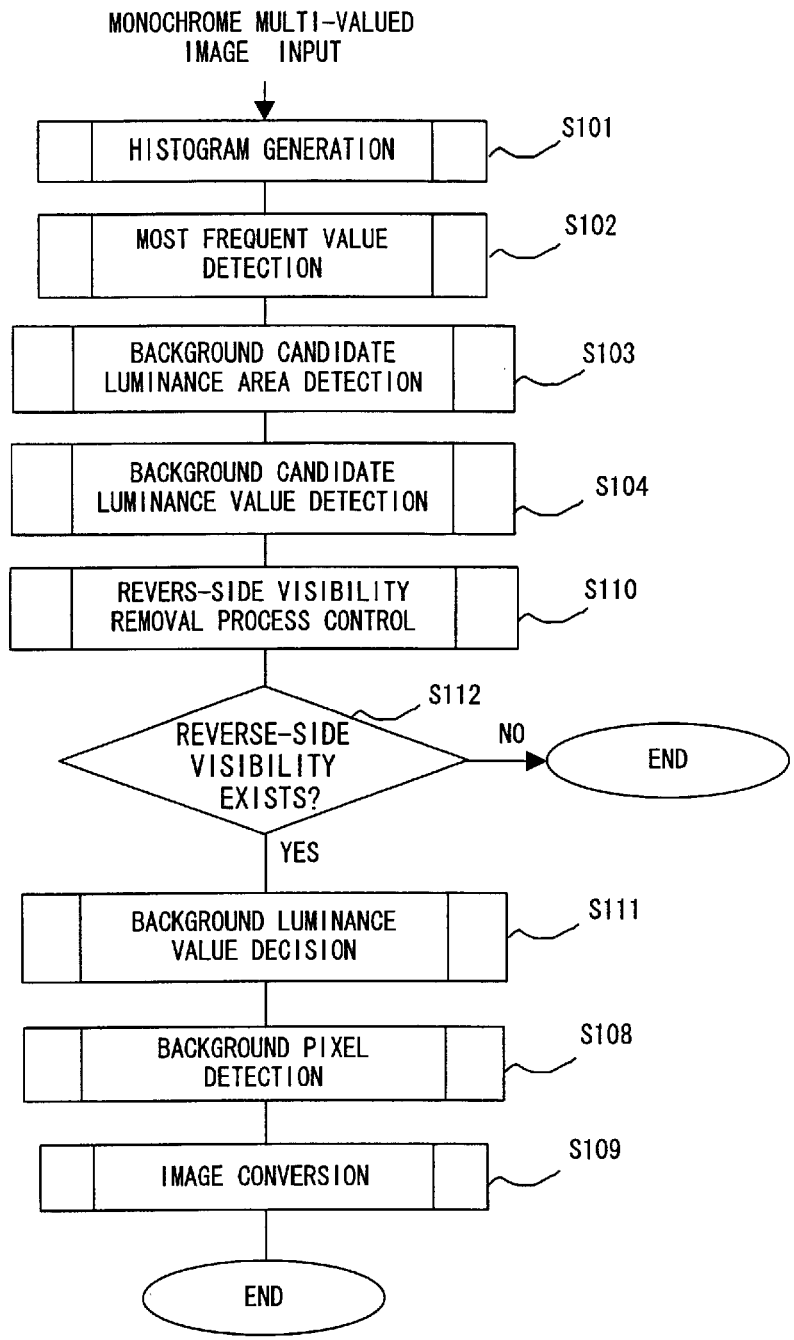
F I G. 4

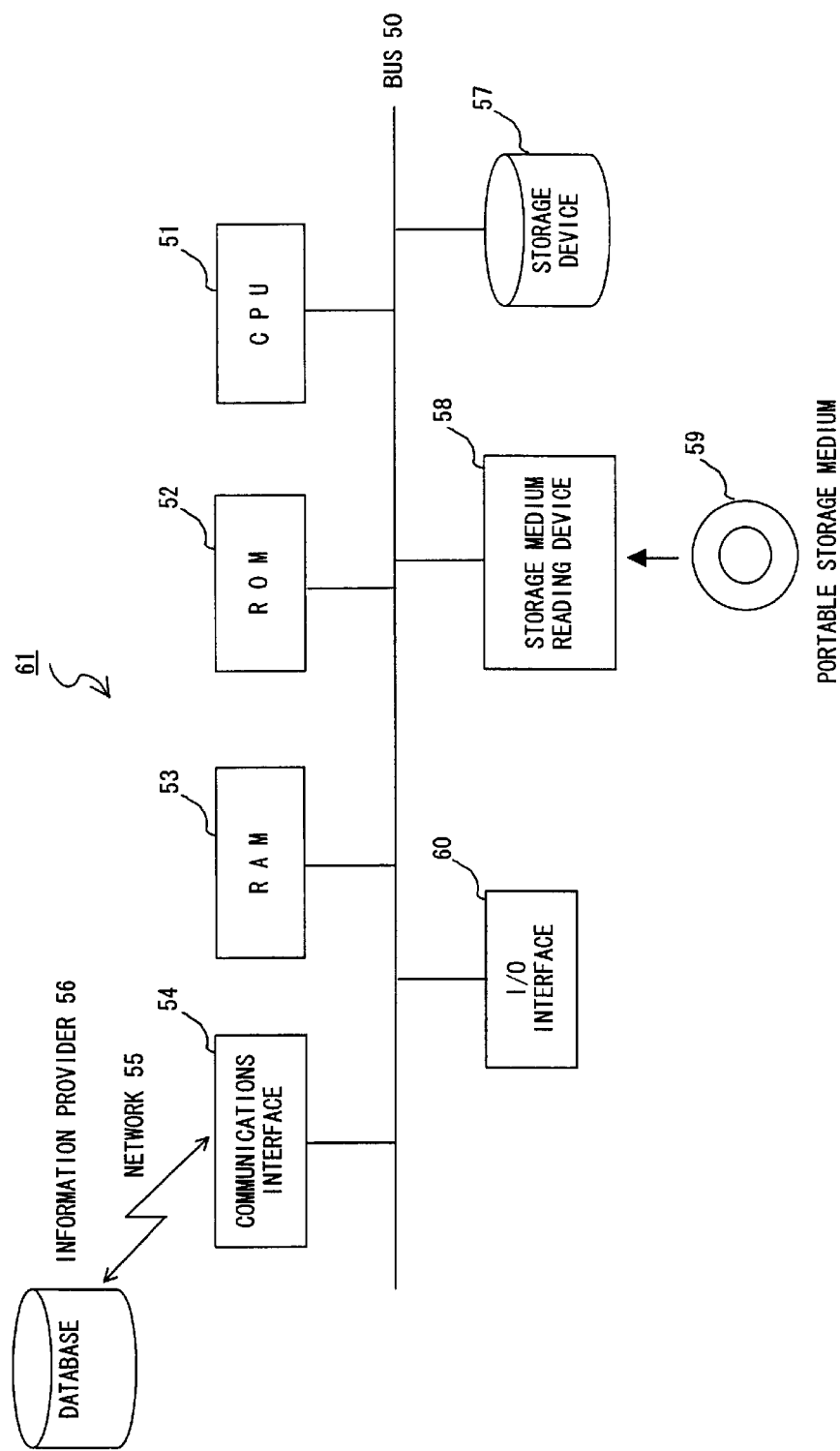
F I G. 35

IMAGE PRODUCTION CONTROLLING DEVICE, IMAGE PRODUCING DEVICE, IMAGE PRODUCTION CONTROLLING METHOD, AND A STORAGE MEDIUM

BACKGROUND OF THE INVENTION

The present invention relates to an image producing device producing an image from which a reverse-side visible image included in input image data is removed.

DESCRIPTION OF THE RELATED ART

As one of the problems of an image reading device, there is a problem of reverse-side visibility such that an image on a reverse side is seen through if the image also exists on the reverse side of an original document to be read, and also the image on the reverse side is captured when the image on the front side is read. The reverse-side visibility particularly occurs if the paper thickness of an original document is thin.

Some typical copying machines make the luminance of a background constant by skipping an image having luminance that is equal to or lower than a predetermined value, and remove an image itself visible on a reverse side in order to prevent such reverse-side visibility. However, if images having low luminance are uniformly skipped as described above, even an image on a front side, which is originally required although its luminance is low, may be skipped.

As a conventional device solving such a problem, for example, the technique disclosed by Japanese Laid-open Patent Publication No. 5-183749 exists. With this technique, the luminance distribution of background pixels is recognized to be a normal distribution, the luminance range of the background is obtained by using a most frequent value "m" of the luminance histogram as a standard, and the background (foundation) portion is separated from an image portion by defining an upper limit "2m" of the luminance range of the background as a threshold value.

Additionally, according to Japanese Laid-open Patent Publication No. 8-237485, a luminance histogram is taken, and background and image portions are separated by determining that the periphery of the most frequent value of the histogram to be a background, and by defining a luminance value which is slightly lower than that having the most frequent value to be a border.

Furthermore, according to Japanese Laid-open Patent Publication 10-257325, an image having luminance that is equal to or lower than that of a reverse-side visible section is not reproduced on recording paper by detecting a peak value from the luminance distribution of an image, by sectioning the luminance area into a background section, the visible section, and an image section based on the peak value, and by performing a binarization process with the use of the intermediate luminance between the image section and the reverse-side visible section as a threshold value.

Still further, according to Japanese Laid-open Patent Publication No. 11-41466, the luminance histogram of a captured image is generated, the luminance value $L_p$ having the highest frequency and the maximum luminance value $L_m$ are detected from the luminance histogram, whether or not reverse-side visibility exists is determined based on the difference between the obtained luminance value $L_p$ having the highest frequency and the maximum luminance value $L_m$, and the background luminance $L_s$ of an original document is decided based on the luminance value $L_p$ having the highest frequency if the reverse-side visibility is determined not to exist, or the background luminance $L_s$ of the original document is decided based on the maximum luminance value $L_m$ if the reverse-side visibility is determined to exist.

Still further, according to Japanese Laid-open Patent Publication No. 1-213073, a color image is captured, histograms are generated for the respective primary colors "R", "G", and "B", and a conversion table is generated by defining a certain density from a peak occurring in a portion the color density of which is close to white to be a threshold value "C", and a white density is evenly output to colors the densities of which are whiter than the threshold value "C", so that the background color is made uniform.

Still further, according to Japanese Laid-open Patent Publication No. 1-196975, pre-scanning is performed when a color image is read, and histograms for the respective RGB of the read image are generated, a threshold value for removing a background color is set, a color brighter than the threshold value is converted into the most brightest color (white) as a background color, so that the background color is removed.

However, the image reading devices recited in the above described publications have the following problems.

Japanese Laid-open Patent Publication Nos. 5-183749 and 8-237485 assume that the portion in which the luminance of image data or the luminance value having the highest frequency exists is a background. Therefore, for example, if there are many reverse-side visible portions, and if the most frequent value is configured by the luminance of a reverse-side visible portion or a luminance value, background luminance or luminance is improperly detected. This is because the most frequent value itself does not represent the background luminance or the luminance.

Since the presence/absence of a reverse-side visible portion is determined by using the association between the peak luminance $L_p$ and the maximum luminance $L_m$ of an original text such as general book information according to Japanese Laid-open Patent Publication No. 11-14166, the presence/absence of a reverse-side visible portion is improperly detected, or the background luminance $L_s$ of the original is improperly decided if a background color is applied to the whole of the original, such as a color magazine, etc.

Japanese Laid-open Patent Publication No. 10-257325 assumes the boundary between a reverse-side visible portion and an image portion from the peak position of density values of a multi-valued image by targeting a monochrome image, and removes the reverse-side visibility with binarization. Accordingly, this technique cannot be applied to a color image or the case where a multi-valued image is required after a reverse-side visible portion is removed.

According to Japanese Laid-open Patent Publication No. 1-213073, a color image is targeted, and a background color is uniformly converted into a bright color. Therefore, if the original background color is dark in the case where a dark reverse-side visible portion exists in the entire image, the background color may be converted into a bright color.

Because Japanese Laid-open Patent Publication No. 1-196975 aims at reducing an amount of toner, a background color is not reproduced. Accordingly, even if a particular background color exists in a reverse-side visible portion, the background color is entirely converted into pure white.

If reverse-side visibility occurs, a text image on the reverse side overlaps the text portion of the image on the front side, and appears on the front side, leading to a big obstacle to viewing of a text image included in an image.

Accordingly, if an original image is read by image reading means and stored onto a magnetic storage medium, etc., it is desirable to record only the front side of the original document read by the image reading means.

SUMMARY OF THE INVENTION

An object of the present invention is to provide an image producing device removing a reverse-side visible image from a background color without damaging the hues of an image so much even if a color is applied to the background of an original.

An image production controlling device according to one aspect of the present invention, which outputs input image data by removing a reverse-side visible portion of the image data, comprises a histogram generating unit generating a luminance value histogram for at least one color from image data, a most frequent value deciding unit deciding the luminance value having the highest frequency from the histogram, and a background candidate luminance area deciding unit deciding an area having a luminance value which will become a background candidate in the neighborhood of the most frequent value.

An image producing device according to another aspect of the present invention, which outputs input image data by removing a reverse-side visible portion from the image data, comprises an image data obtaining unit obtaining image data, a first storing unit storing the obtained image data, a histogram generating unit generating a luminance value histogram for at least one color from the image data stored in the first storing unit, a most frequent value deciding unit deciding the luminance value with the highest frequency, and a background candidate luminance area deciding unit deciding an area having a luminance value which will become a background candidate in the neighborhood of the most frequent value.

An image production controlling method according to one aspect of the present invention, with which input image data is output by removing a reverse-side visible portion from the image data, comprises: generating a luminance value histogram for at least one color from image data; determining the luminance value having the highest frequency from the histogram; and deciding an area having a luminance value which will become a background candidate in the neighborhood of the most frequent value.

The method according to the present invention further comprises: deciding a luminance value to be defined as background luminance within the area; and replacing the luminance value of the image data within the area with the luminance value to be defined as the background luminance. This method is installed on an image production controlling device or an image producing device.

As described above, according to the present invention, a histogram is generated from image data, and the most frequent value of the histogram is obtained. The luminance value corresponding to the most frequent value indicates the luminance value of a reverse-side visible portion. Therefore, the area of the image, which has the luminance value in the neighborhood of the most frequent value within the histogram, is defined to be a reverse-side visibility area, whereby the area in which the reverse-side visibility occurs within the image can accurately be identified and an effective means for removing a reverse-side visible portion is provided.

Additionally, a reverse-side visible portion can be removed without damaging the hues of a background by obtaining the luminance value to be defined as background luminance, and by replacing the obtained value with the luminance value of the area.

BRIEF DESCRIPTION OF THE DRAWINGS

FIG. 2 is a schematic diagram showing the concept of the system according to the preferred embodiment;

FIG. 4 is a flowchart showing the outline of the processing performed by the image producing device according to the preferred embodiment (No. 2);

FIG. 35 is a block diagram showing the hardware configuration required when the processing according to the preferred embodiments are implemented by software.

DESCRIPTION OF THE PREFERRED EMBODIMENTS

Figure 1:
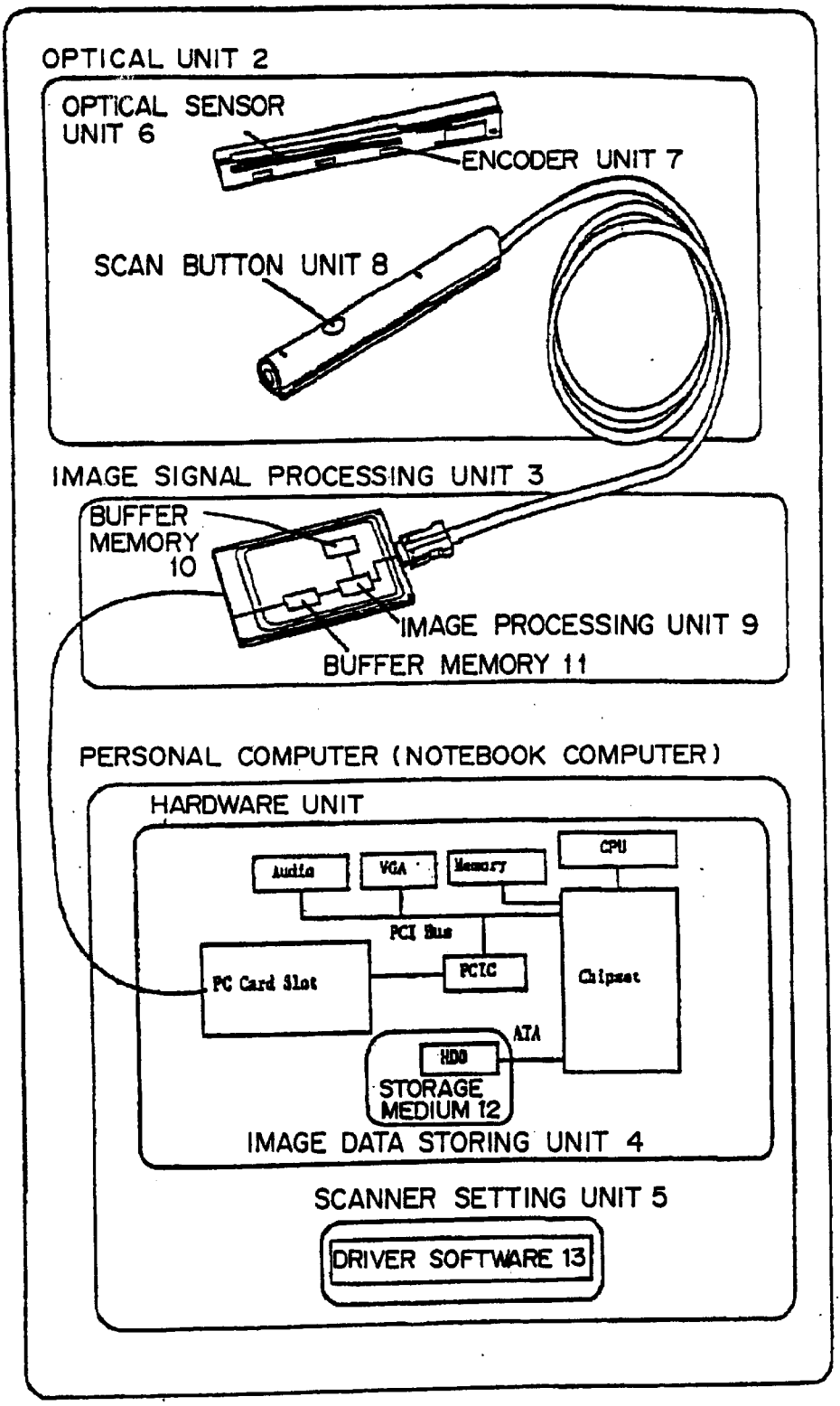
FIG. 1 shows the outline of the configuration of a system according to a preferred embodiment.

Explained hereinafter are preferred embodiments where the present invention is applied to a color scanner (hereinafter referred to as a scanner) as an image producing device, by referring to the drawings. It should be noted that the image producing device according to the present invention is not limited to the application of a scanner. This device is applicable also to a copying machine, a printer, etc. Namely, a copying machine can be configured to make a copy by removing a reverse-side visible portion when a document printed on both sides of thin paper is copied. In addition, a printer can be configured to print a document image transferred in a reverse-side visible state after removing the reverse-side visible portion.

FIG. 1 shows the outline of the configuration of a system according to a preferred embodiment of the present invention, while FIG. 2 shows the concept of this system.

Explained first are the outline of the configuration of the system according to this preferred embodiment, and the operations for producing an image of an original document onto a storage medium according to this preferred embodiment, by referring to FIG. 1.

A scanner 1 according to this preferred embodiment is mainly composed of an optical unit 2, an image signal processing unit 3, an image data storing unit 4, and a scanner setting unit 5.

The optical unit 2 comprises: an optical sensor unit 6 reading image data for one line in a main scanning direction; an encoder 7 detecting an amount of a move of the optical sensor unit 6 in a sub-scanning direction; and a scan button unit 8 controlling the start and the end of reading. Namely, the optical unit 2 shown in FIG. 1 is a hand-held scanner. However, the present invention is not limited to such a hand-held scanner, and is applicable also to a stationary scanner.

The image signal processing unit 3 is composed of: an image processing unit 9 performing each image process type such as A/D conversion, and shading correction; a buffer memory 10 storing the data for shading correction, the data for each image process type, a pre-scanned image, etc.; and a buffer memory 11 sequentially storing image signals for one line according to an output signal of the encoder unit 7.

The image data storing unit 4 reads a plurality of image signals stored in the buffer memory 11, and stores the read signals onto a storage medium 12 such as a magnetic storage medium, etc. In this preferred embodiment, the above described image signal processing unit 3 is connected as a PC card conforming to the PCMCIA standard by a PCMCIA slot of a notebook computer of the image data storing unit 4 and a PCMCIA interface. The hardware of the personal computer being the image data storing unit 4 is composed of; a CPU; a Chipset (integrated circuits for executing the capabilities related to the CPU, which, for example, controls data exchanges between the CPU and its peripheral devices in FIG. 1); a Memory (configured by a ROM or a RAM); a VGA (Video Graphics Array: a controller performing a process for displaying a graphic on the screen of a notebook computer); an Audio (an audio reproduction/input device); a PCIC (PCMCIA Controller IC: a controller for controlling a PC card); a PC Card Slot; and a storage medium 12 (hard disk, HDD, and the like). The Memory, the VGA, the Audio, and the PCIC are connected to the Chipset via a PCI (Peripheral Component Interconnect: the standard of a local bus developed by Intel Corp.) bus. Additionally, the storage medium 12 is connected to the Chipset by an ATA (AT Attachment) being one type of a hard disk drive.

The scanner setting unit 5 makes scanner settings such as the resolution for scanning, whether or not to specify a reverse-side visibility removal process, etc. with driver software 13 on the personal computer to which the scanner is connected.

This preferred embodiment assumes that the scanner setting unit 5 is implemented as driver software on external hardware such as a personal computer, etc. However, the scanner setting unit 5 may be implemented in a hardware manner by arranging an operation panel on the hardware of a scanner.

FIG. 2 is a schematic diagram showing the concept of the system to which a preferred embodiment according to the present invention is applied.

A scanner 1 is composed of an image sensor, a light source LED for irradiating light on an original document, the above described encoder, and a switch for activating the scanner 1 so as to start reading an original document.

The signal output from the scanner 1 is input to an image signal processing unit 3 arranged within a PC card. After performing A/D conversion for the image of the original document from the image sensor, the image signal processing unit 3 inputs this image to an image processing unit. The image sensor, the light source LED, and a buffer memory 11 are controlled by a controlling unit performing an image sensor control and an image process. The controlling unit receives the signal from the encoder or the switch, and invokes the original document reading operation of the scanner 1. Additionally, the above described buffer memory 10 is connected to the image processing unit.

The image processing unit is connected to the PC card slot of the personal computer via a PCMCIA controlling unit. Driver software, which is software installed on the personal computer, controls the image processing unit of the PC card inserted into the PC card slot, and enables the scanner 1 to capture an original document image.

Figure 3:
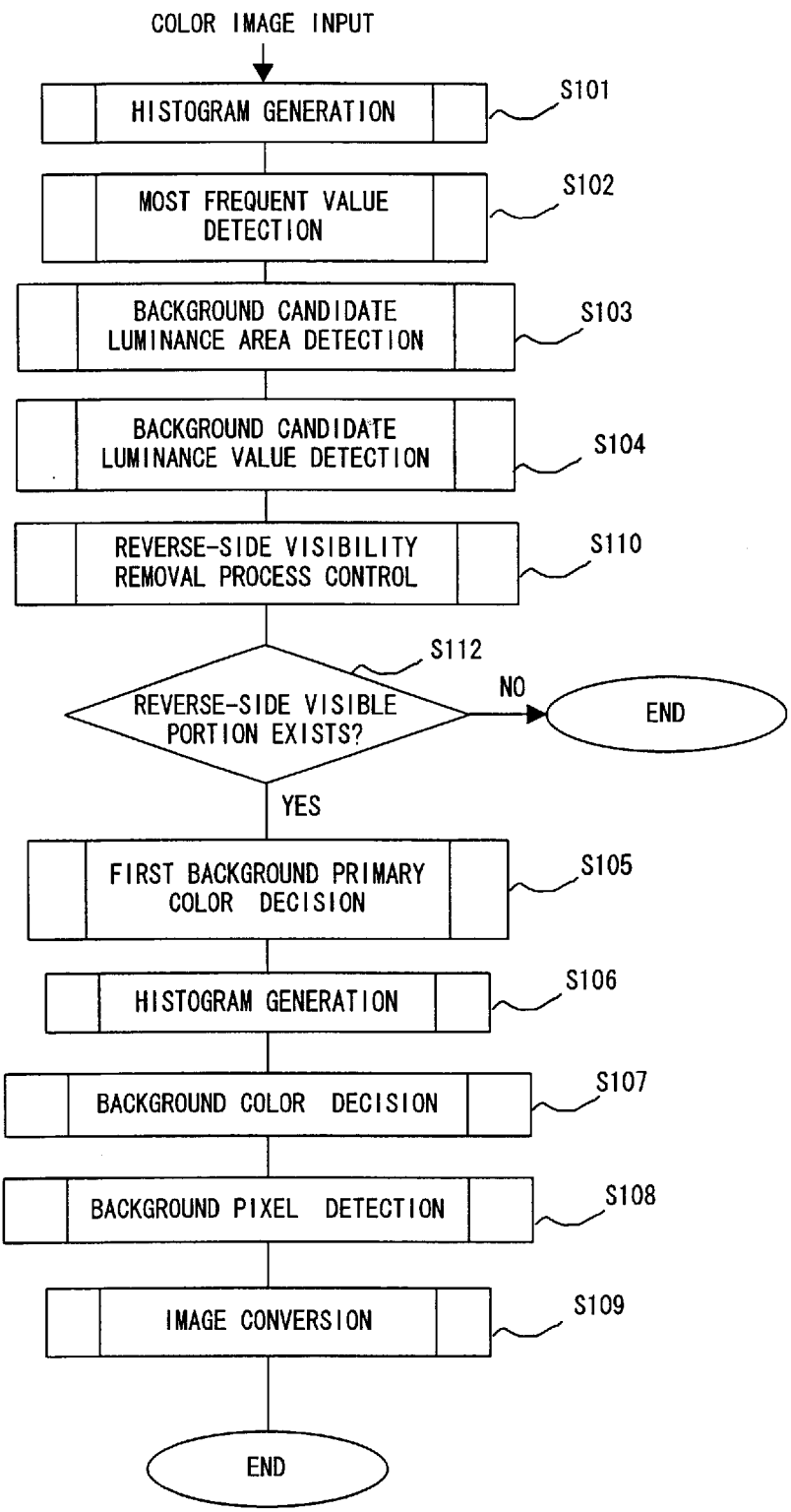
FIG. 3 is a flowchart showing the outline of the processing performed by an image producing device according to a preferred embodiment (No. 1)

FIGS. 3 and 4 are flowcharts showing the outline of the processing performed by the image producing device according to the preferred embodiment of the present invention.

FIG. 3 shows the processing performed in the case of a color image, while FIG. 4 shows the processing performed in the case of a monochrome multi-valued image (gray-scale image).

In FIG. 3, luminance histograms are generated for respective three primary colors RGB from the whole of an input color image in a histogram generation step S101. The most frequent values $R_{hf}$, $G_{hf}$, and $B_{hf}$ of the luminance values of the three primary colors RGB are detected from the generated histograms in a most frequent value detection step S102.

Next, luminance values $R_{wl}$, $R_{wr}$, $G_{wl}$, $G_{wr}$, $B_{wl}$, and $B_{wr}$ the frequencies of which are equal to or higher than threshold values $TH_r$, $TH_g$, and $TH_b$ within luminance ranges $R_{hf}-W_r \leq R \leq R_{hf}+W_r$, $G_{hf}-W_g \leq G \leq G_{hf}+Wg$, $B_{hf}-Wb \leq B \leq B_{hf}+Wb$ ("R", "G", and "B" are respectively the luminance values of the three primary colors RGB) using threshold values Wr, Wg, and Wb, which center around the detected most frequent values $R_{hf}$, $G_{hf}$, and $B_{hf}$, are detected in a background candidate luminance area detection step S103. The luminance ranges in which the detected luminance values are the left and right ends are defined to be background candidate luminance areas $R_{wl} \leq R \leq R_{wr}$, $G_{wl} \leq G \leq G_{wr}$, and $B_{wl} \leq B \leq B_{wr}$ (where "R", "G", and "B" are the respective luminance values of the three primary colors RGB).

Here, it is possible to change Wr, Wg, and Wb depending on the type of an input captured image, or to make their values constant regardless of the type of a captured image. However, in this preferred embodiment, optimum values that are empirically calculated beforehand for each type of a captured image are prepared, and a user selects the type of a captured image, so that one of a plurality of combinations of Wr, Wg, and Wb is decided.

Here, $TH_r$, $TH_g$, and $TH_b$ may be changed depending on the type of an input captured image. However, $TH_r$, $TH_g$, and $TH_b$ may be made constant regardless of a capture image type. In this preferred embodiment, a plurality of combinations of $TH_r$, $TH_g$, and $TH_b$ with which a reverse-side visible portion is included in the background candidate luminance areas $R_{wl} \leq R \leq R_{wr}$, $G_{wl} \leq G \leq G_{wr}$, and $B_{wl} \leq B \leq B_{wr}$ are empirically decided beforehand for each type of a captured image, and a user selects the type of a captured image, so that a combination of $TH_r$, $TH_g$, and $TH_b$ is decided from among the plurality of combinations of $TH_r$, $TH_g$, and $TH_b$ according to the type of a captured image.

Next, background candidate luminance values are detected in a background candidate luminance value detection step S104. Here, the maximum points included in the ranges $R_{hf} \leq R \leq R_{wr}$, $G_{hf} \leq G \leq G_{wr}$, and $B_{hf} \leq B \leq B_{wr}$ between the most frequent values and the right ends $R_{wr}$, $G_{wr}$, and $B_{wr}$ of the background candidate luminance areas for the respective three primary colors RGB are defined to be background candidate luminance values $R_c$, $G_c$, and $B_c$. Normally, only one value is decided as each of $R_c$, $G_c$, and $B_c$. However, since a plurality of maximum points are sometimes detected due to noise influence, etc., a plurality of background candidate luminance values are detected for each of RGB in some cases.

In step S112, a user is made to manually set whether or not to execute the following reverse-side visibility removal process depending on whether or not a reverse-side visible portion exists on an original document. If the user makes a setting for specifying the non-execution of the reverse-side visibility removal process, the following processes are not performed and the processing is terminated. If the user makes a setting for specifying the execution of the reverse-side visibility removal process, the processes in and after step S105 are performed.

In a first background primary color decision step S105, the background candidate luminance values $R_c$, $G_c$, and $B_c$ detected in the background candidate luminance detection step S104 are compared, and the primary color having the highest frequency is decided to be the first background primary color. However, if pluralities of background candidate luminance values $R_c$s, $G_c$s, and $B_c$s are detected due to noise influence or depending on the state of a captured image, precedence is given to the primary colors having smaller numbers of detected background candidate luminance values for the three primary colors RGB. For example, if the number of $R_c$s is "1" and that of $G_c$s is "2", $R_c$ is decided to be the first background primary color representing a background color even if the frequency of $G_c$ is higher than that of $R_c$. This is because a primary color with a smaller number of background candidate luminance values is considered to have less influence such as noise, and a greater possibility of being a background color.

If pluralities of background candidate luminance values are detected for all of the primary colors, and if there are a plurality of primary colors having the smallest detection number, the primary color having a higher background candidate luminance value frequency is decided to be the first background primary color.

Then, in a histogram generation step S106, pixels that are the same primary color component as the first background primary color and have the luminance value matching the first background primary color are detected from the captured image, and luminance histograms are generated from the detected pixels for the two primary colors other than the first background primary color. In a background color decision step S107, the luminance values having the highest frequency within the same luminance areas as the background candidate luminance areas detected in the background candidate luminance area detection step S103 are decided to be the second and third background primary colors. With the above described procedure, the background colors $R_b$, $G_b$, and $B_b$ are decided.

Next, in a background pixel detection step S108, pixels having luminance values within the background candidate luminance areas are detected from the captured image as background pixels. The colors of the detected background pixels are converted into the background colors $R_b$, $G_b$, and $B_b$ in an image conversion step S109, so that an image from which a reverse-side visible portion is removed is produced.

FIG. 4 is a flowchart showing the processing performed in the case where an image is a monochrome multi-valued (gray-scale) image.

If a captured image is a monochrome multi-valued image, the luminance values of the image are input, and a luminance histogram for the whole of the captured image is generated in a histogram generation step S101. The most frequent value $L_{hf}$ among the luminance values of the captured image is detected from the generated luminance histogram in a most frequent value detection step S102.

Then, in a background candidate luminance area detection step S103, luminance values $L_{wl}$ and $L_{wr}$, the frequencies of which are equal to or higher than a threshold value $TH_1$, are detected within a range $L_{hf}-W1 \leq L \leq L_{hf}+W1$ (where "L" is a luminance value) centering around the most frequent value $L_{hf}$. The luminance range in which the detected luminance values are the left and right ends is defined to be a background candidate luminance area $L_{wl} \leq L \leq L_{wr}$ ("L" is a luminance value).

Here, W1 may be changed depending on the type of an input captured image, or may be made constant. However, in this preferred embodiment, a plurality of optimum values that are empirically calculated for each captured image type beforehand are prepared, and a user selects the type of a captured image, so that one W1 is decided from among the plurality of optimum values.

Additionally, according to this preferred embodiment, a plurality of $TH_1$s with which a reverse-side visible portion is included in a background candidate luminance area $L_{wl} \leq L \leq L_w$, are empirically decided beforehand for each captured image type, and a user selects the type of a captured image, whereby one $TH_1$ is selected.

Next, in a background candidate luminance value detection step S104, the maximum value between the most frequent value and the right end $L_{wr}$ of the background candidate luminance area is detected as a background candidate luminance value $L_c$. This procedure is exactly the same as that performed for one primary color such as "R", etc. in the case of a color image.

If no background candidate luminance value $L_c$ is detected in the background candidate luminance value detection step S104, it is determined that no reverse-side visible portion is included in the captured image in a reverse-side visibility removal process control step S110. Therefore, the reverse-side visibility removal process is not executed.

In step S112, a user is made to specify whether or not to execute the reverse-side visibility removal process. If the user specifies the non-execution of the reverse-side visibility removal process, the processing is terminated. If the user specifies the execution of the reverse-side visibility removal process, the processing proceeds to step S111.

Then, a background luminance value is decided in a background luminance value decision step S111. If a plurality of background candidate luminance values are detected, the background candidate luminance value having the highest frequency is defined to be a background luminance value.

Next, in a similar manner as in the case of a color image, pixels having luminance values within the background candidate luminance area are detected as background pixels in a background pixel detection step S108, the luminance values of the detected background pixels are converted into the background luminance value in an image conversion step S109, so that an image from which a reverse-side visible portion is removed is produced.

Explained next are the details of the reverse-side visibility removal process according to this preferred embodiment, which is applied to color image. Note that, however, this process is applied also to a monochrome image with a similar procedure. Namely, for a monochrome multi-valued image, processing similar to that performed for only one of the three primary colors of a color image is executed.

Normally, when an original document is read by a scanner, pre-scanning is performed at a resolution lower than that for real scanning prior to actual image data capturing, and the information required for each image process type is calculated.

Also in this preferred embodiment, pre-scanning is performed at a low resolution prior to real scanning, and a pre-scanned image is stored in a buffer memory 10 (refer to FIG. 1). An amount of calculation time and an amount of used memory are saved by using a pre-scanned image. However, information required for removing a reverse-side visible portion may be calculated from a really scanned image in the case where pre-scanning is not performed to simplify scanning operations, and the like.

As described above, RGB histograms for a pre-scanned image are generated from the pre-scanned image stored in the buffer memory 10 (refer to FIG. 1).

Figure 5:
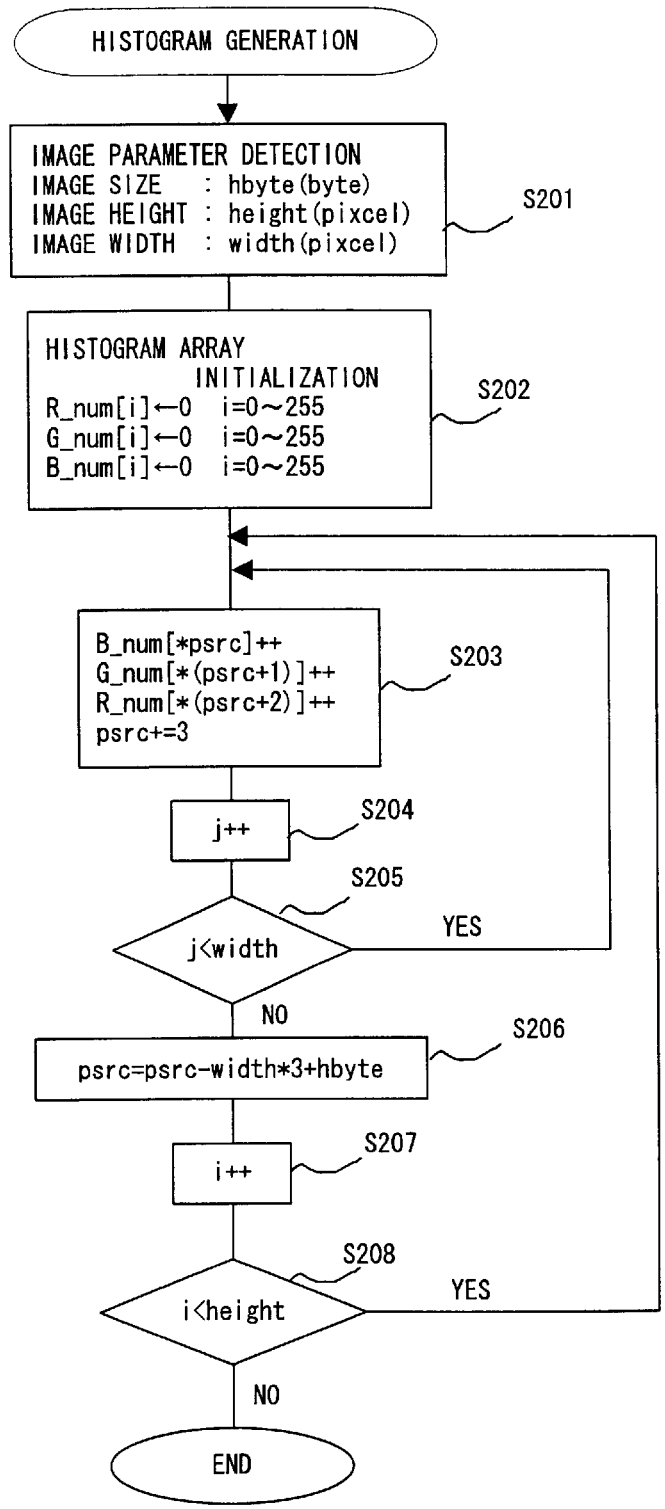
FIG. 5 is a flowchart showing the details of the process performed in a histogram generation step S101 of FIG. 3.

FIG. 5 is a flowchart showing the details of the process performed in the histogram generation step S101 of FIG. 3.

First of all, in step S201, image parameters are detected, and assigned to respective variables. Here, the size of an image is assigned to a variable "hbyte" in bytes, the height of the image is assigned to a variable "height" in pixels, and the width of the image is assigned to a variable "width" in pixels. Here, the memory area in which image data is stored is assumed to be pointed to by a pointer "psrc".

Next, in step S202, arrays for histograms are initialized. Namely, arrays R_num[i], G_num[i], and B_num[i] for the respective RGB histograms are set to "0". Here, "i" takes a value from "0" to "255", and represents each of luminance values of RGB.

Then, a luminance value *psrc (a pointer preceded by an asterisk indicates the value of data stored in a memory area pointed to by the pointer) of the primary color "B" is obtained from the image data pointed to by the pointer "psrc" in step S203. Therefore, B_num[*psrc] is incremented by "1". Since the luminance value *(psrc+1) of the primary color "G" is obtained in a similar manner, G_num [*(psrc+1)] is incremented by "1". Similarly, R_num[* (psrc+2)] is incremented by "1". Then, the pointer "psrc" is incremented by "3", and step S203 is terminated.

That is, the operation performed in step S203 is an operation generating a histogram which indicates how many pixels exist at each luminance value by pointing to the position of the luminance value data with the pointer "psrc", by reading the luminance value data from the image data including the luminance values in an order of "B", "G", and "R", by substituting the read data for an array the argument of which is a luminance value, and by incrementing by "1" the array the argument of which is the assigned luminance value.

Then, in step S204, "j" is incremented by "1". "j" is a variable which measures the width of an image in pixels. Accordingly, if "j" is smaller than the image width "width" in step S205, the process goes back to step S203 where the histogram generation operation is performed for one line. If "j" is equal to or larger than the image width "width" in step S205, it means that one line of the image has been processed. The process therefore proceeds to step S206.

In step S206, the position of the pointer "psrc" is moved to the beginning of the next line. This preferred embodiment assumes that an image is stored in a descending order of addresses. Therefore, the pointer "psrc" moves to the beginning of the line above 1 line. The reason why the "width" multiplied by "3" is subtracted from "psrc" is that one pixel is composed of the luminance values of the three primary colors, and the width of data for one line becomes a width obtained by multiplying the image width by 3. Therefore, "psrc" is moved from the end of the line to the beginning of the above line. As a result of this operation, the address value pointed to by the pointer "psrc" becomes a value smaller by one line in comparison with the value before the operation in step S206 is performed. Accordingly, the operation for moving up one line from the bottom of an image (from a higher address) by adding the image size "hbyte" to "psrc" which has become the value smaller than by one line.

In step S207, after the pointer "psrc" is moved up, the value of the variable "i" indicating which line of an image is processed is incremented by "1" in order to represent that one line has been processed after the pointer "psrc" is moved up. In step S208, it is determined whether or not "i" is equal to or larger than the height "height" of the image. If "i" is smaller than "height", the entire image has not been processed yet. Therefore, the process goes back to step S203 where the histogram generation operation is performed. If "i" becomes equal to or larger than "height", it means that the histogram generation operation has been performed for the entire image. The process is therefore terminated.

With the above described process, histograms are respectively generated for the primary colors "R", "G", and "B".

Next, the most frequent values $R_{hf}$, $G_{hf}$, and $B_{hf}$ are detected from the generated histograms.

Figure 6A:
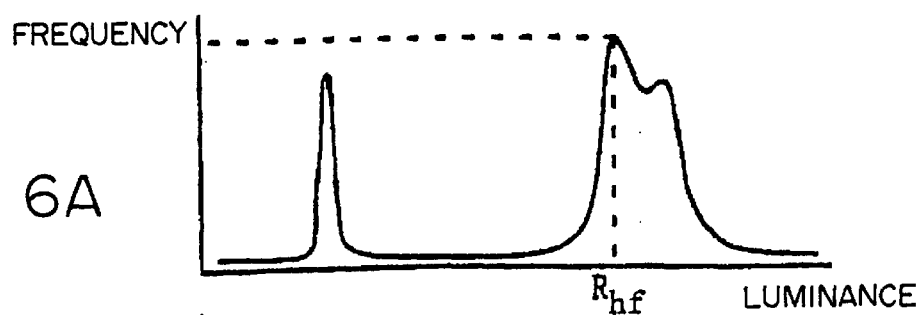
FIG. 6A exemplifies a histogram for "R"
Figure 6B:
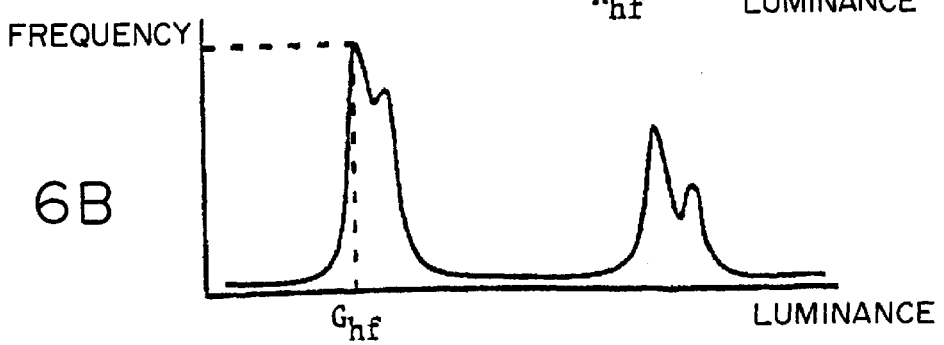
FIG. 6B exemplifies a histogram for "G"
Figure 6C:
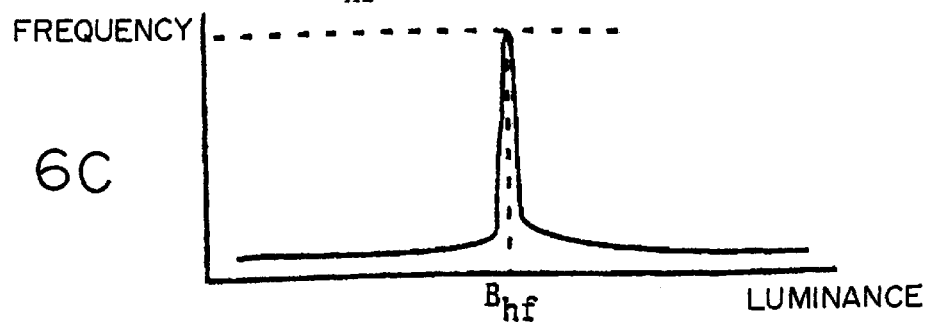
FIG. 6C exemplifies a histogram for "B"

FIGS. 6A through 6C show histograms. FIG. 6A shows the histogram for "R", FIG. 6B shows the histogram for "G", and FIG. 6C shows the histogram for "B".

As shown in FIGS. 6A through 6C, after histograms are generated for the respective "R", "G", and "B", luminance values having the highest frequency are decided from the histograms. This decision is respectively made for "R", "G", and "B".

Figure 7:
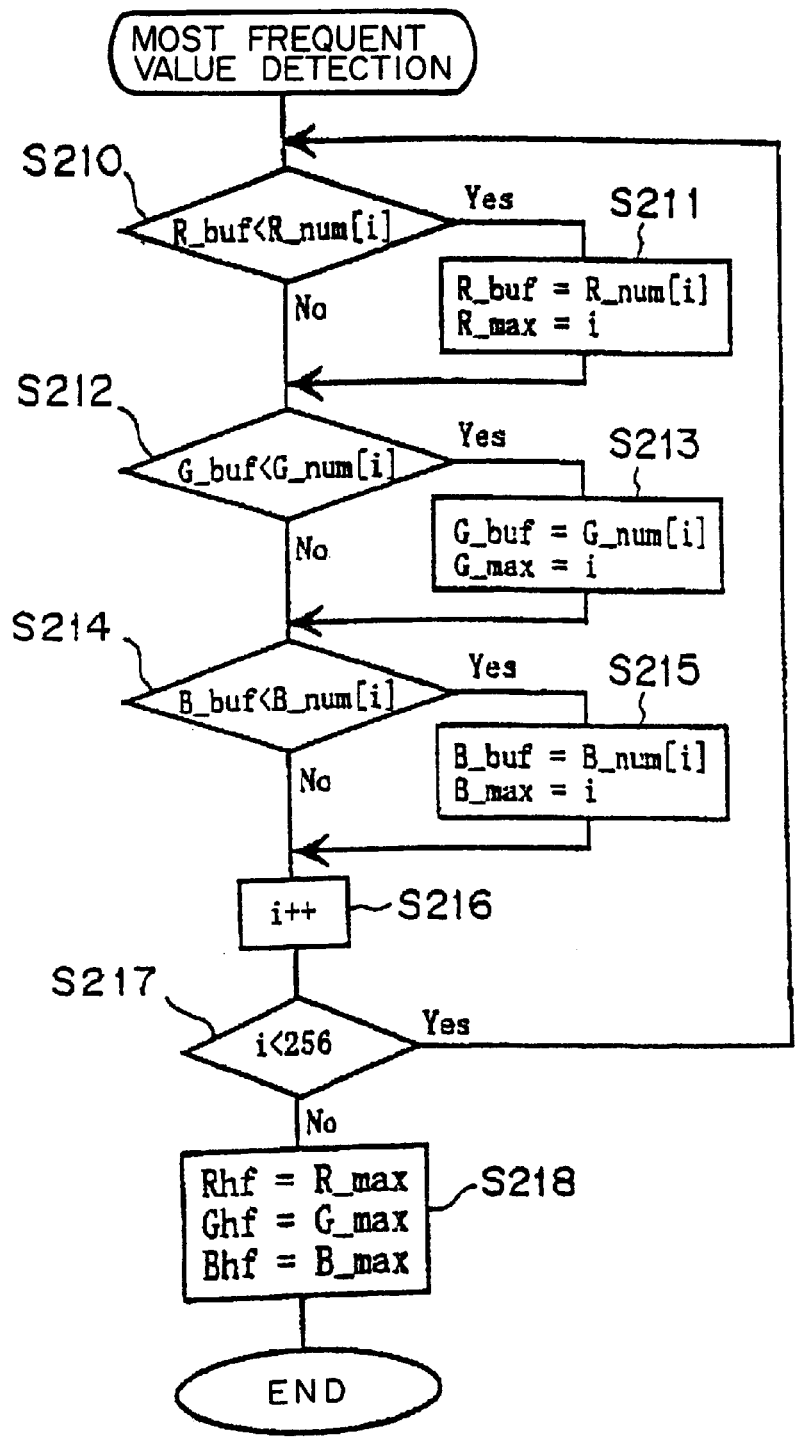
FIG. 7 is a flowchart showing the details of the process performed in a most frequent value detection step S102 of FIG. 3.

FIG. 7 is a flowchart showing the details of the process performed in the most frequent value detection step S102 of FIG. 3.

Prior to the start of this process, buffers R_buf, G_buf, and B_buf, which temporarily store the frequencies of the most frequent values, are initialized to a value such as "0". Also buffers R_max, G_max, and B_max, which store the luminance values having the highest frequencies, are initialized to a value such as "0". Furthermore, a variable "i" representing a luminance value is initialized to a value such as "0".

Then, in step S210, arrays R_num[i] storing the histogram generated earlier and R_buf are compared. If R_buf is smaller, the value of R_num[i] is substituted for R_buf, and "i" being the luminance value is substituted for R_max. The process then proceeds to step S212. If R_buf is equal to or larger than R_num[i] in step S210, the process proceeds to step S212 without performing any operations.

Next, in step S212, the largeness/smallness relationship between G_buf and G_num[i] is examined. If G_buf is equal to or larger than G_num[i], the process proceeds to step S214. If G_num[i] is larger, G_num[i] is substituted for G_buf and "i" is substituted for G_max in step S213. The process then proceeds to step S214.

In step S214, the largeness/smallness relationship between B_buf and B_num[i] is examined. If B_buf is equal to or larger than B_num[i], the process proceeds to step S216. If B_buf is smaller than B_num[i], B_num[i] is substituted for B_buf, and "i" is substituted for B_max in step S215. The process then proceeds to step S216.

In step S216, "i" representing a luminance value is incremented by "1". It is then determined whether or not the process is performed up to the maximum luminance value "255". If "i" is smaller than "256", the process goes back to step S210, and is repeated. If "i" is equal to or larger than "256", it is determined that the process has terminated for all of the luminance values. The process therefore proceeds to step S218.

In step S218, the buffers R_max, G_max, and B_max, which store the luminance values having the highest frequencies, are respectively substituted for $R_{hf}$, $G_{hf}$, and $B_{hf}$. Here, the process is terminated.

Figure 8A:
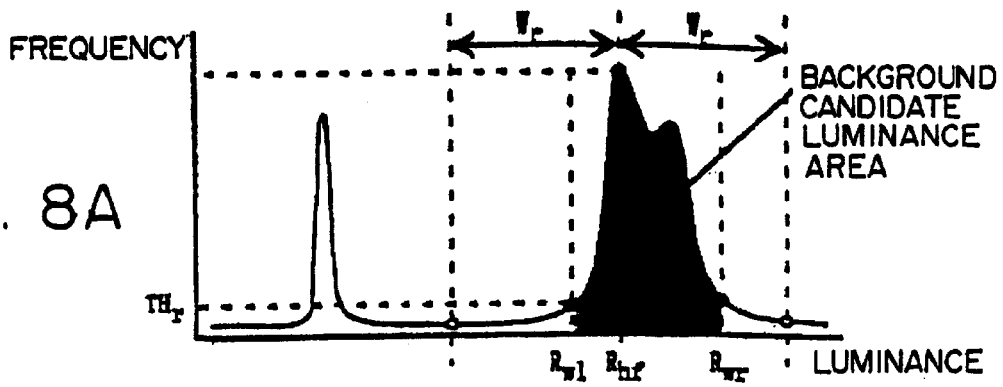
FIGS. 8A to 8C show the state of the detection of a background candidate luminance area.
Figure 8B:
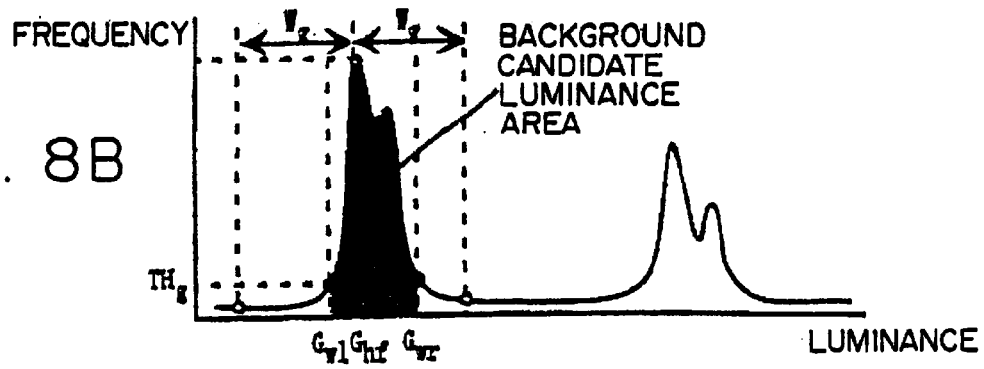
Figure 8C:
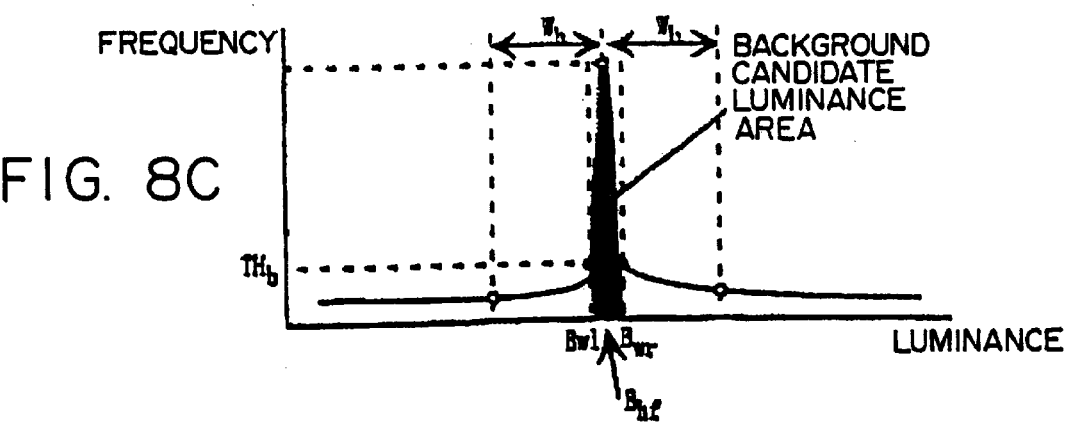

FIGS. 8A through 8C show the concept of detection of a background candidate luminance area.

FIGS. 8A, 8B, and 8C respectively show the detection of "R", "G", and "B" among the three primary colors.

Next, luminance values $R_{wl}$, $R_{wr}$, $G_{wl}$, $G_{wr}$, $B_{wl}$, and $B_{wr}$, the frequencies of which are equal to or higher than threshold values $TH_r$, $TH_g$, and $TH_b$, are detected within the luminance ranges $R_{hf}-W_r \leq R \leq R_{hf}+W_r$, $G_{hf}-W_g \leq G \leq G_{hf}+Wg$, and $B_{hf}-Wb \leq B \leq B_{hf}+Wb$ ("R", "G", and "B" are respectively the luminance values of the three primary colors RGB) of threshold values Wr, Wg, and Wb, which center around the detected most frequent values $R_{hf}$, $G_{hf}$, and $B_{hf}$. The luminance ranges in which the detected luminance values are the left and right ends are defined to be background candidate luminance areas $R_{wl} \leq R \leq R_{wr}$, $G_{wl} \leq G \leq G_{wr}$, and $B_{wl} \leq B \leq B_{wr}$ ("R", "G", and "B" are luminance values respecively).

Figure 9:
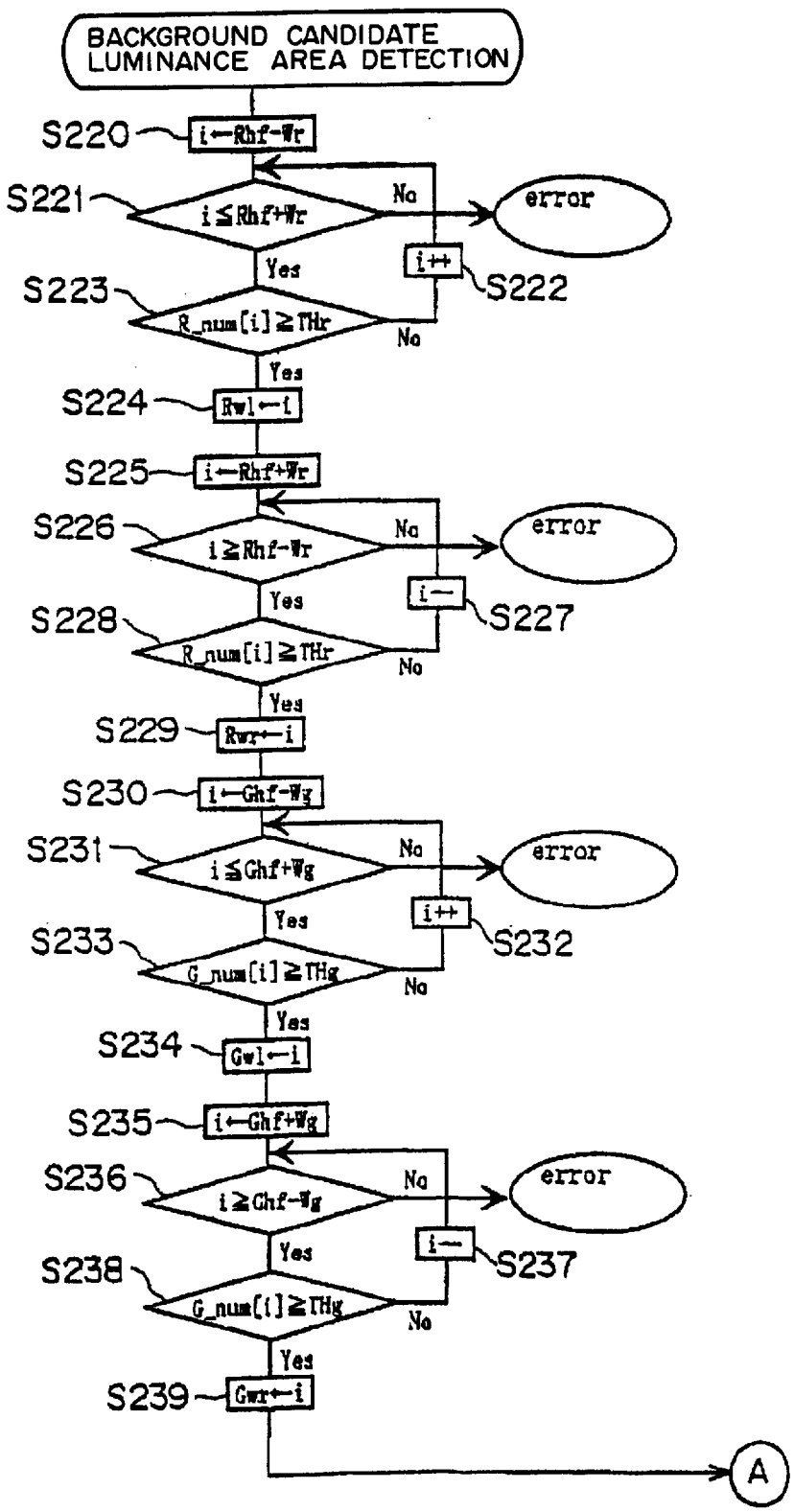
FIG. 9 is a flowchart showing the details of the process performed in step S103 of FIG. 3 (No. 1)
Figure 10:
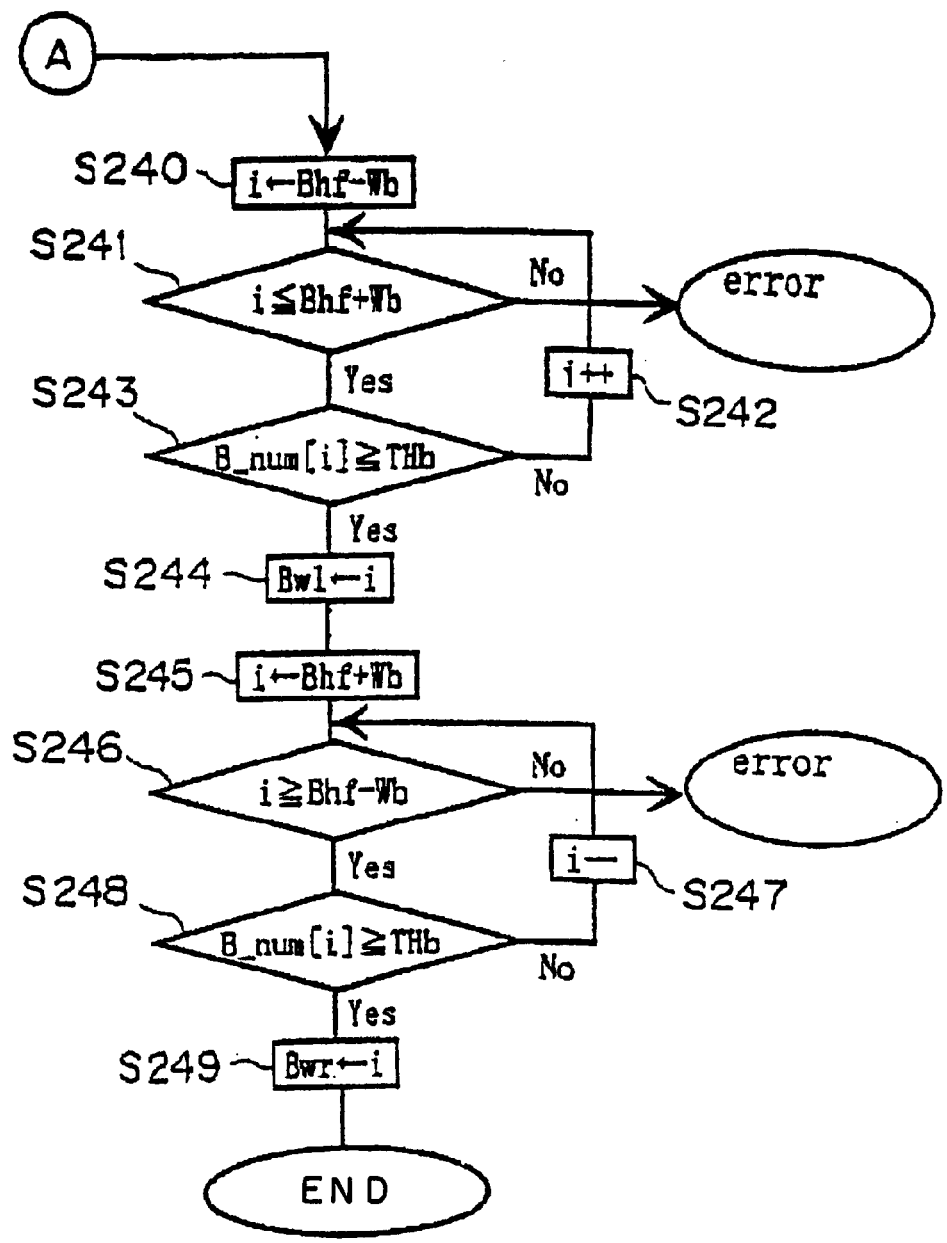
FIG. 10 is a flowchart showing the details of the process performed in step S103 of FIG. 3 (No. 2)

FIGS. 9 and 10 are flowcharts showing the details of the process performed in step S103 of FIG. 3.

First of all, in step S220, a luminance value $R_{hf}$-wr, which is smaller by a predetermined number than the luminance value having the highest frequency of "R", is substituted for a variable "i". Then, it is determined whether or not "i" is equal to or smaller than $R_{hf}$+Wr in step S221. If the result of the determination made in step S221 is "NO", it is notified to a user that an error has occurred and the process is terminated. If the result of the determination made in step S221 is "YES", the process proceeds to step S223.

In step S223, it is determined whether or not the most frequent value R_num[i] when the luminance value is "i" is equal to or larger than a threshold value $TH_r$. If the result of the determination made in step S223 is "NO", "i" is incremented by "1" in step S222. The process then goes back to step S221. If the result of the determination made in step S223 is "YES", the process proceeds to step S224 where the value of "i" is substituted for $R_{wl}$ which represents a smaller luminance value having a frequency value equal to or larger than the threshold value.

Then, a luminance value $R_{hf}$+Wr, which is larger by a predetermined number than the luminance value having the highest frequency of "R", is substituted for the variable "i". Next, in sep S226, it is determined whether or not "i" is equal to or larger than $R_{hf}$-Wr. If the result of the determination made in step S226 is "NO", it is notified to a user that an error has occurred, and the process is terminated. If the result of the determination made in step S226 is "YES", the process proceeds to step S228.

In step S228, it is determined whether or not the frequency value R_num[i] when the luminance value is "i" is equal to or larger than the threshold value $TH_r$ for the primary color "R". If the result of the determination made in step S228 is "NO", "i" is decremented by "1" in step S227. The process then goes back to step S226. If the result of the determination made in step S228 is "YES", the process proceeds to step S229 where the value of "i" is substituted for Rwr which represents a larger luminance value having a frequency value equal to or larger than the threshold value.

For the primary color "G", a luminance value $G_{hf}$-Wg, which is smaller by a predetermined number than the luminance value having the highest frequency "G", is substituted for the variable "i" in step S230. Then, it is determined whether or not "i" is equal to or smaller than $G_{hf}$+Wg in step S231. If the result of the determination made in step S231 is "NO", it is notified to a user that an error has occurred, and the process is terminated. If the result of the determination made in step S231 is "YES", the process proceeds to step S233.

In step S233, it is determined whether or not the frequency value G_num[i] when the luminance value is "i" is equal to or larger than the threshold value $TH_g$ for the primary color "G". If the result of the determination made in step S233 is "NO", "i" is incremented by "1" in step S232. The process then goes back to step S231. If the result of the determination made in step S233 is "YES", the process proceeds to step S234 where the value of "i" is substituted for $G_{wl}$ which represents a smaller luminance value having a frequency value equal to or larger than the threshold value.

Then, in step S235, a luminance value $G_{hf}$+Wg, which is larger by a predetermined number than the luminance value having the highest frequency of "G", is substituted for the variable "i". Next, it is determined whether or not "i" is equal to or larger than $G_{hf}$–Wg in step S236. If the result of the determination made in step S236 is "NO", it is notified to a user that an error has occurred, and the process is terminated. If the result of the determination made in step S236 is "YES", the process proceeds to step S238.

In step S238, it is determined whether or not the luminance value G_num[i] when the luminance value is "i" is equal to or larger than the threshold value $TH_g$ for the primary color "G". If the result of the determination made in step S238 is "NO", "i" is decremented by "1" in step S237. The process then goes back to step S236. If the result of the determination made in step 238 is "YES", the process proceeds to step S239 where the value of "i" is substituted for $G_{wr}$ which represents a larger luminance value having a frequency value equal to or larger than the threshold value.

For the primary color "B", a luminance value $B_{hf}$–Wb, which is smaller by a predetermined number than the luminance value having the highest frequency of "G", is substituted for the variable "i" in step S240. Then, it is determined whether or not "i" is equal to or smaller than $B_{hf}$+Wb in step S241. If the result of the determination made in step S241 is "NO", it is notified to a user that an error has occurred, and the process is terminated. If the result of the determination made in step S241 is "YES", the process proceeds to step S243.

In step S243, it is determined whether or not the frequency value B_num[i] when the luminance value is "i" is equal to or larger than the threshold value $TH_b$ for the primary color "B". If the result of the determination made in step S243 is "NO", "i" is incremented by "1" in step S242. The process then goes back to step S241. If the result of the determination made in step S243 is "YES", the process proceeds to step S244 where the value of "i" is substituted for $B_{wl}$ which represents a smaller luminance value having a frequency value equal to or larger than the threshold value.

Then, instep S245, a luminance value $B_{hf}$+Wb, which is larger by a predetermined number than the luminance value having the highest frequency of "B", is substituted for the variable "i". Next, it is determined whether or not "i" is equal to or larger than $B_{hf}$–Wb in step S246. If the result of the determination made in step S246 is "NO", it is notified to a user that an error has occurred, and the process is terminated. If the result of the determination made in step S246 is "YES", the process proceeds to step S248.

In step S248, it is determined whether or not the frequency value B_num[i] when the luminance value is "i" is equal to or larger than the threshold value $TH_b$ for the primary color "B". If the result of the determination made in step S248 is "NO", "i" is incremented by "1" in step S247. The process then goes back to step S246. If the result of the determination made in step 248 is "YES", the process proceeds to step S249 where the value of "i" is substituted for $B_{wr}$ which represents a larger luminance value having a frequency value equal to or larger than the threshold value.

Up to this point, the background candidate luminance area detection process is terminated.

Here, according to this preferred embodiment, a plurality of combinations of optimum values, which are empirically calculated beforehand for each capture image type, and a user selects the type of a captured image, so that one combination of Wr, Wg, and Wb is decided from among the plurality of combinations.

Additionally, a plurality of combinations of $TH_r$, $TH_g$, and $TH_b$ with which a reverse-side visible portion is included in the background candidate luminance areas $R_{wl} \leq R \leq R_{wr}$, $G_{wl} \leq G \leq G_{wr}$, and $B_{wl} \leq B \leq B_{wr}$ are empirically decided beforehand for each captured image type, and a user selects the type of a captured image, so that one combination of $TH_r$, $TH_g$, and $TH_b$ is decided from among the plurality of combinations.

Figure 11:
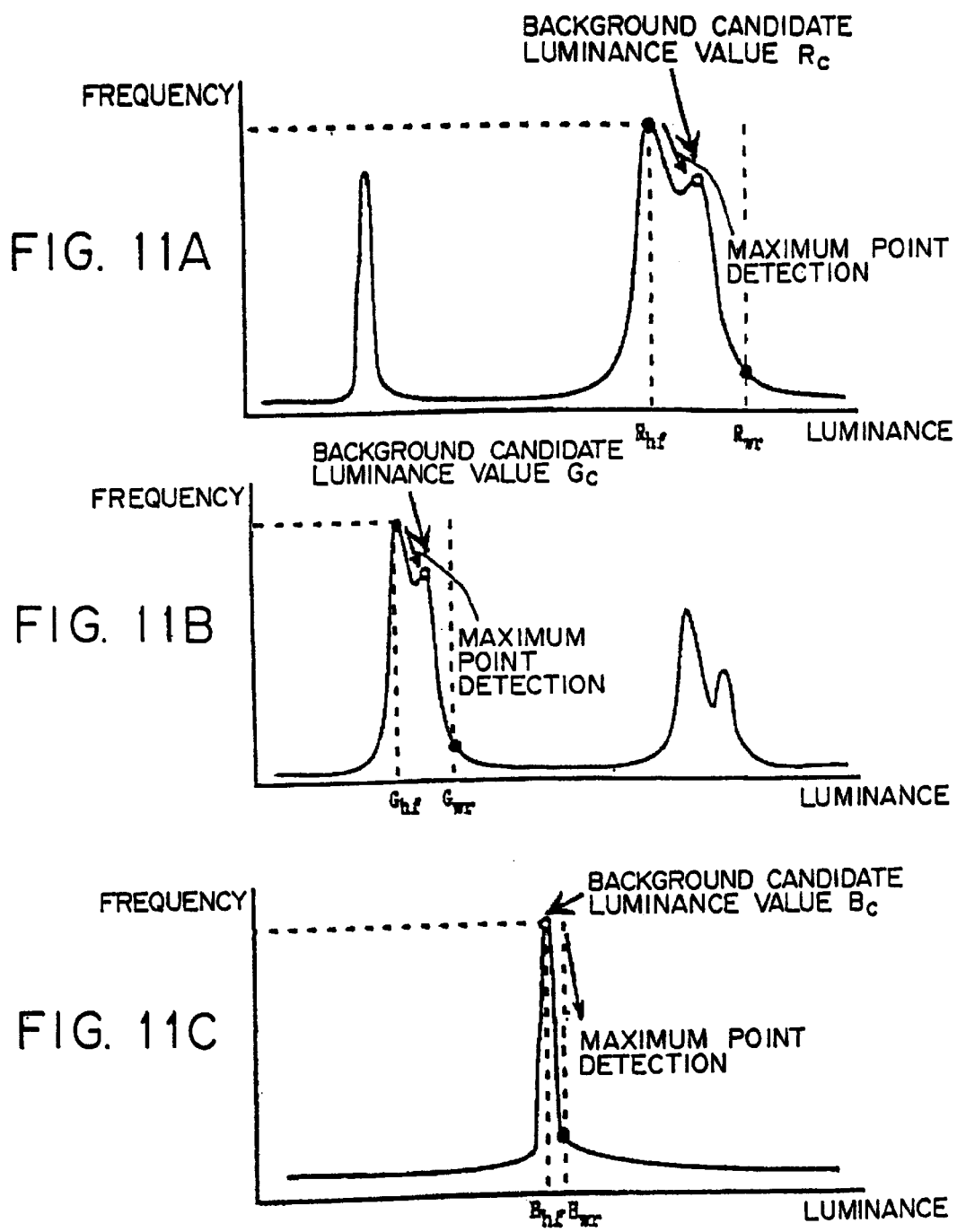
FIGS. 11A to 11C show the concept of the method detecting a background candidate luminance value.

FIGS. 11A through 11C show the concept of the method detecting background candidate luminance values.

FIGS. 11A, 11B, and 11C respectively show the detection of the primary colors "R", "G", and "B". The maximum points included in the ranges $R_{hf} \leq R \leq R_{wr}$, $G_{hf} \leq G \leq G_{wr}$, and $B_{hf} \leq B \leq B_{wr}$ between the most frequent values of the three primary colors RGB and the right ends $R_{wr}$, $G_{wr}$, and $B_{wr}$ of the background candidate luminance areas are assumed to be background candidate luminance values $R_c$, $G_c$, and $B_c$ for the three primary colors RGB. Normally, only one value is decided as each of $R_c$, $G_c$, and $B_c$. However, since a plurality of maximum points are sometimes detected due to noise influence, etc., pluralities of background candidate luminance values are respectively detected for RGB in some cases.

Note that the detection of the maximum values from histograms is made with the following procedure.

Assuming that the luminance value to be observed within the luminance range $R_{hf} \leq R \leq R_{wr}$ is "i", R(i), G(i), and B(i), which satisfy the following expressions, are detected as background candidate values $R_c$, $G_c$, and $B_c$.

$$(R(i)-R(i-1)) \times (R(i)-R(i+1)) > TH3_r, \text{ and,}$$

$$(R(i)-R(i+1)) > 0$$

$$(G(i)-G(i-1)) \times (R(i)-R(i+1)) > TH3_g, \text{ and,}$$

$$(G(i)-G(i+1)) > 0$$

$$(B(i)-B(i-1)) \times (B(i)-B(i-1)) > TH3_b, \text{ and,}$$

$$(B(i)-B(i+1)) > 0$$

(where R(i–1), R(i), R(i+1), G(i–1), G(i), G(i+1), B(i–1), B(i), and B(i+1) are luminance values, $TH3_r$, $TH3_g$, and $TH3_b$ are threshold values larger than "0", and "i" ranges from "0" to "255" if an input image is represented by the three primary colors RGB of respective 8 bits.)

Note that the initial value of "i" is luminance is assumed to be a luminance value which gives the most frequent value. "i" is incremented in succession, and the maximum value is searched toward the end having a larger luminance value of the background candidate luminance area. If a reverse-side visible portion exists, the most frequent value indicates the luminance of the reverse-side visible portion. The luminance of the background including no reverse-side visible portion is brighter than that of a reverse-side visible portion. Accordingly, the search is performed in the direction from the most frequent value to a brighter luminance value, so that real background luminance can be found.

Here, $TH3_r$, $TH3_g$, and $TH3_b$ may be changed depending on the type of an input captured image. However, $TH3_r$, $TH3_g$, and $TH3_b$ may be made equal. According to this preferred embodiment, a plurality of combinations of $TH3_r$, $TH3_g$, and $TH3_b$ are empirically determined beforehand for each captured image type, and a user selects the type of a captured image, so that one combination is selected from among the plurality of combinations of $TH_r$, $TH_g$, and $TH_b$.

In this preferred embodiment, no particular process such as noise elimination, etc. are not performed. However, a noise elimination process such as histogram smoothing, etc. may be performed.

Figure 12:
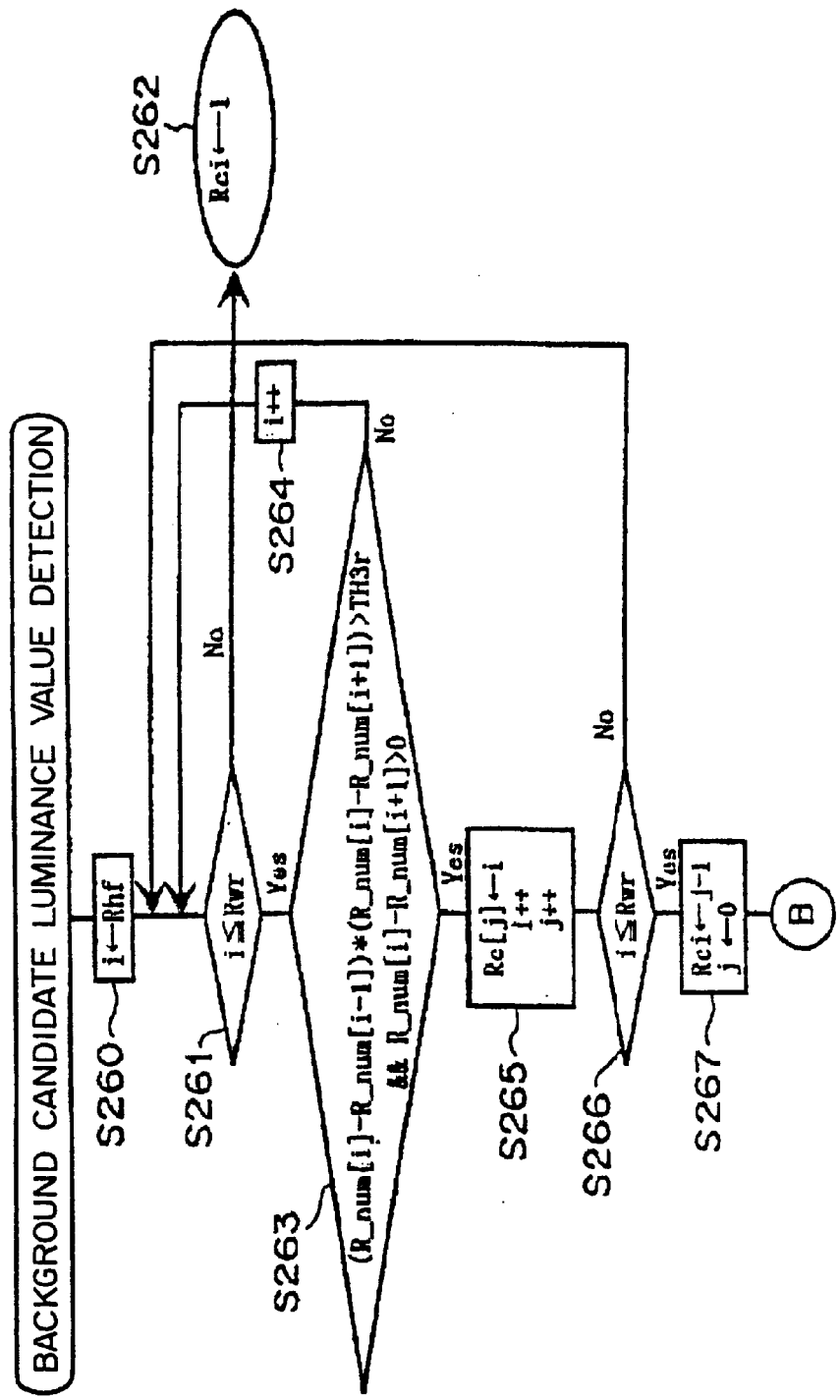
FIG. 12 is a flowchart showing the details of the process performed in step S104 of FIG. 3 (No. 1)
Figure 13:
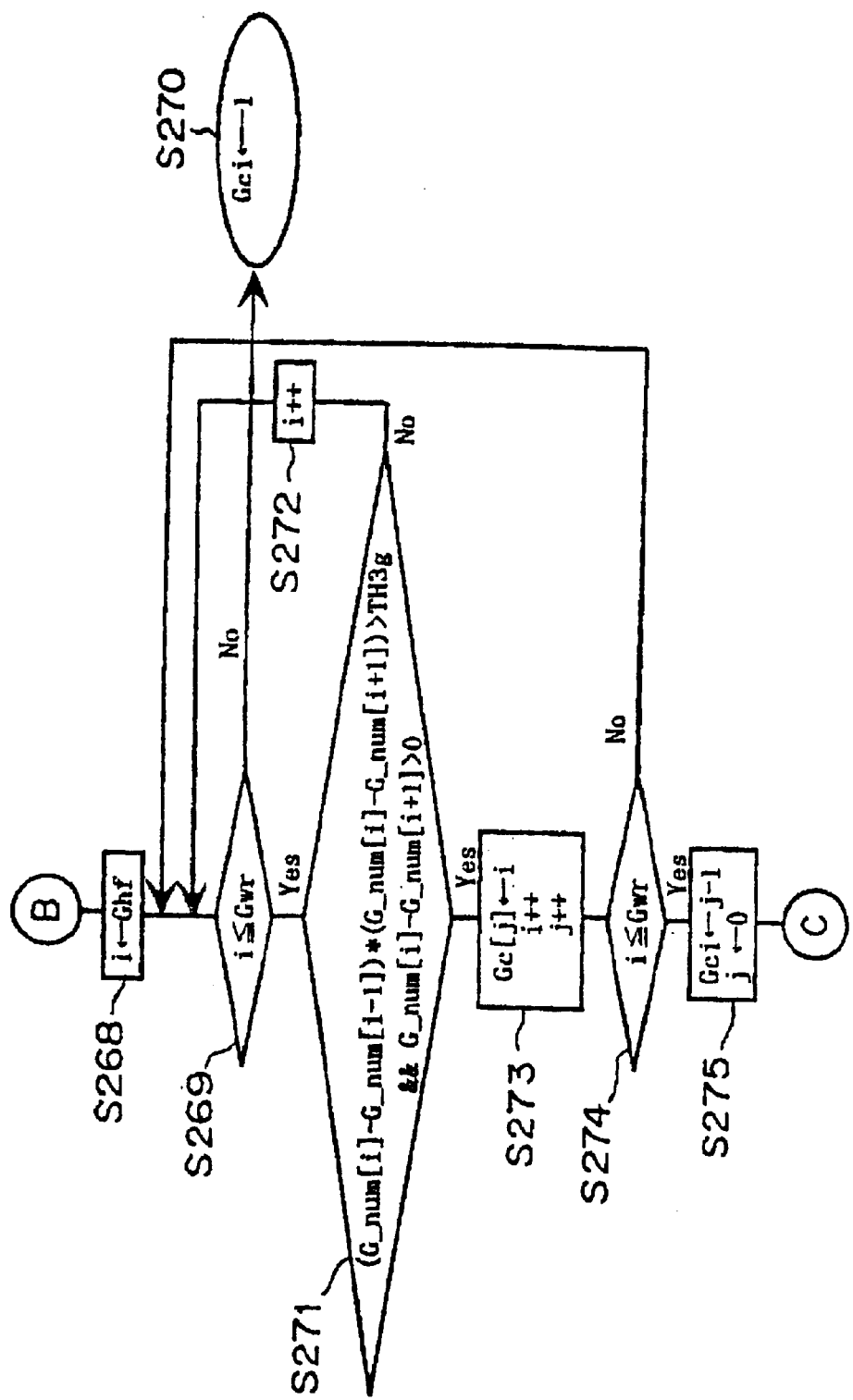
FIG. 13 is a flowchart showing the details of the process performed in step S104 of FIG. 3 (No. 2)
Figure 14:
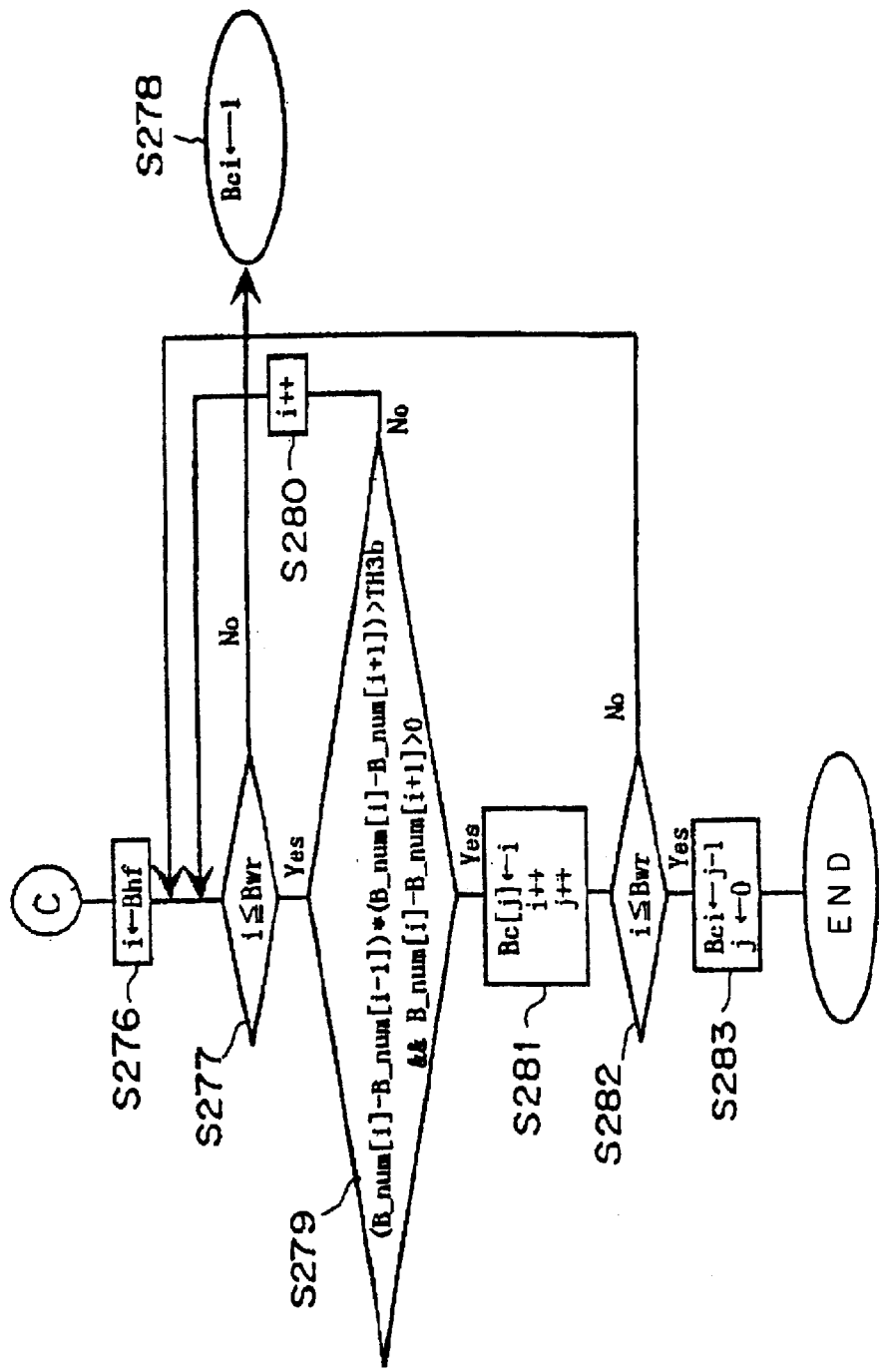
FIG. 14 is a flowchart showing the details of the process performed in step S104 of FIG. 3 (No. 3)

FIGS. 12 through 14 are flowcharts showing the details of the process performed in step S104 of FIG. 3.

First of all, in step S260, $R_{hf}$ is substituted for "i" in step S260. Then, in step S261, it is determined whether or not "i" is equal to or smaller than $R_{wr}$. If the result of the determination made in step S261 is "NO", "−1" is substituted for $R_{ci}$ in step S262, and the process is terminated. If the result of the determination made in step S261 is "YES", the following expressions are evaluated in step S263.

$(R\_num[i]-R\_num[i-1])*(R\_num[i]-R\_num[i+1])>TH3_r$, and, $R\_num[i]-R\_num[i+1]>0$ If the result of the determination made in step S263 is "NO", the process proceeds to step S264 where "i" is incremented by "1". The process then goes back to step S261. If the result of the determination made in step S263 is "YES", the process proceeds to step S265 where "i" is substituted for $R_c[j]$, and "i" and "j" are respectively incremented by "1". With this operation, the luminance at the maximum value is substituted for $R_c[j]$, and "j" results in a number relating to the maximum value.

Next, it is determined whether or not "i" is equal to or smaller than $R_{wr}$ in step S266. If the result of this determination is "NO", the process goes back to step S261. If the result of the determination is "YES", the process proceeds to step S267 where "j−1" is substituted for $R_{ci}$, and "j" is set to "0". The process then proceeds to step S268.

In step S268, $G_{hf}$ is then substituted for "i". In step S269, it is determined whether or not "i" is equal to or smaller than $G_{wr}$. If the result of the determination made in step S269 is "NO", "−1" is substituted for $G_{ci}$ in step S270. The process is then terminated. If the result of the determination made in step S269 is "YES", the following expressions are evaluated in step S271.

$(G\_num[i]-G\_num[i-1])*(G\_num[i]-G\_num[i+1])>TH3_g$, and, $G\_num[i]-G\_num[i+1]>0$ If the result of the determination made in step S271 is "NO", the process proceeds to step S272 where "i" is incremented by "1". The process then goes back to step S269. If the result of the determination made in step S271 is "YES", the process proceeds to step S273 where "i" is substituted for $G_c[j]$, and "i" and "j" are respectively incremented by "1". With this operation, the luminance having the maximum value is substituted for $G_c[j]$, and "j" results in a number relating to the the maximum value.

Then, it is determined whether or not "i" is equal to or smaller than $G_{wr}$ in step S274. If the result of this determination is "NO", the process goes back to step S269. If the result of the determination is "YES", the process proceeds to step S275 where "j−1" is substituted for $G_{ci}$, and "j" is set to "0". The process then proceeds to step S276.

$B_{hf}$ is then substituted for "i" in step S276. In step S277, it is determined whether or not "i" is equal to or smaller than $B_{wr}$. If the result of the determination made in step S277 is "NO", "−1" is substituted for $B_{ci}$ in step S278, and the process is terminated. If the result of the determination made in step S277 is "YES", the following expressions are evaluated in step S279.

$(B\_num[i]-B\_num[i-1])*(B\_num[i]-B\_num[i+1])>TH3_b$, and, $B\_num[i]-B\_num[i+1]>0$ If the result of the determination made in step S279 is "NO", the process proceeds to step S280 where "i" is incremented by "1". The process then goes back to step S277. If the result of the determination made in step S279 is "YES", the process proceeds to step S281 where "i" is substituted for $B_c[j]$, and "i" and "j" are respectively incremented by "1". With this operation, the luminance having the maximum value is substituted for $G_c[j]$, and "j" results in a number relating to the maximum value.

Then, it is determined whether or not "i" is equal to or smaller than $B_{wr}$ in step S282. If the result of this determination is "NO", the process goes back to step S277. If the result of the determination is "YES", the process proceeds to step S283 where "j−1" is substituted for $B_{ci}$, and "j" is set to "0". Here, the background candidate luminance value detection process is terminated.

If none of the background candidate luminance values $R_c$, $G_c$, and $B_c$ are detected in the background candidate luminance value detection step S104, it is determined that a captured image includes no reverse-side visible portion. Therefore, the reverse-side visibility removal process is not performed, and the image data is stored in the buffer memory 11 (refer to FIG. 1).

Figure 15:
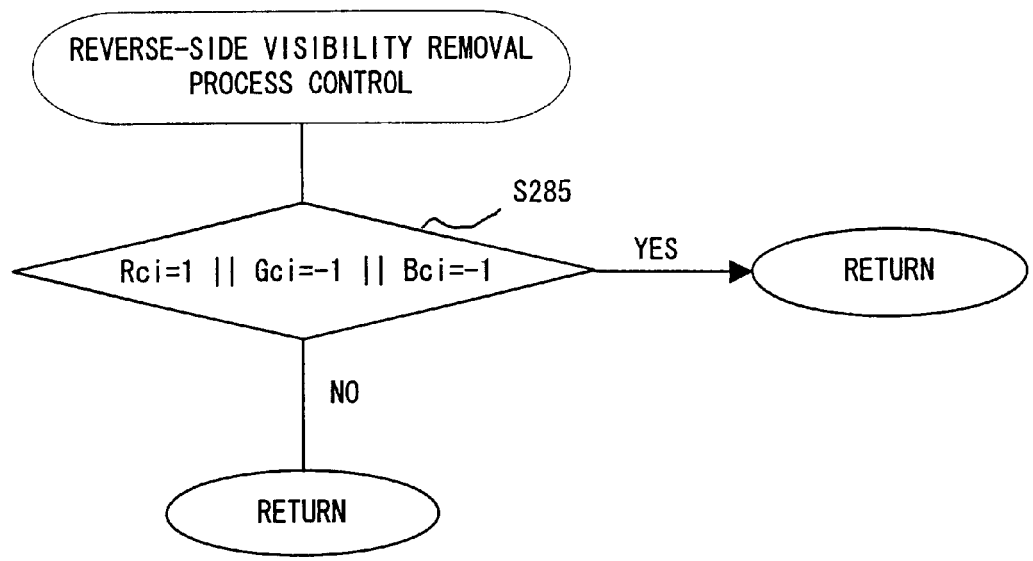
FIG. 15 is a flowchart showing the details of the process performed in a reverse-side visibility removal control process step S110 of FIG. 3.

FIG. 15 is a flowchart showing the details of the reverse-side visibility removal process control step S110 of FIG. 3.

First of all, it is determined whether or not any of $R_{ci}$, $G_{ci}$ and $B_{ci}$, which are obtained in FIGS. 12 through 14, is "−1" in step S285. If the result of the determination made in step S285 is "YES", it is determined that no reverse-side visible portion exists. If the result of the determination made in step S285 is "NO", it is determined that a reverse-side visible portion exists.

Also for a monochrome multi-valued image (gray-scale image), it is determined that a captured image includes no reverse-side visible portion, if no background candidate luminance value $L_c$ is detected. Therefore, the reverse-side visibility removal process is not performed, and the image data is stored in the buffer memory 11 (refer to FIG. 1).

Next, the background candidate luminance values $R_c$, $G_c$, and $B_c$, which are detected in the background candidate luminance value detection step S104, are compared, and the primary color having the highest frequency is decided to be the first background primary color. However, if pluralities of background candidate luminance values $R_c$s, $G_c$s, and $B_c$s are detected due to noise influence or depending on the state of a captured image, precedence is given to the primary color having a smaller detected background number. For example, if one $R_c$ and two $G_c$s are detected, $R_c$ is decided to be the first background color even if the frequency of $G_c$ is higher than that of $R_c$. This is because a primary color with a smaller number of detected background candidate luminance values is considered to have less influence such as noise, and a greater possibility of being a background color. If pluralities of background candidate luminance values are detected for all of the primary colors, and if there are a plurality of primary colors having the smallest detection number, the primary color having a higher frequency of the background luminance value is decided to be the first background color.

FIGS. 16 through 24 are flowcharts showing the details of the process performed in the first background primary color decision step S105 of FIG. 3.

Figure 16:
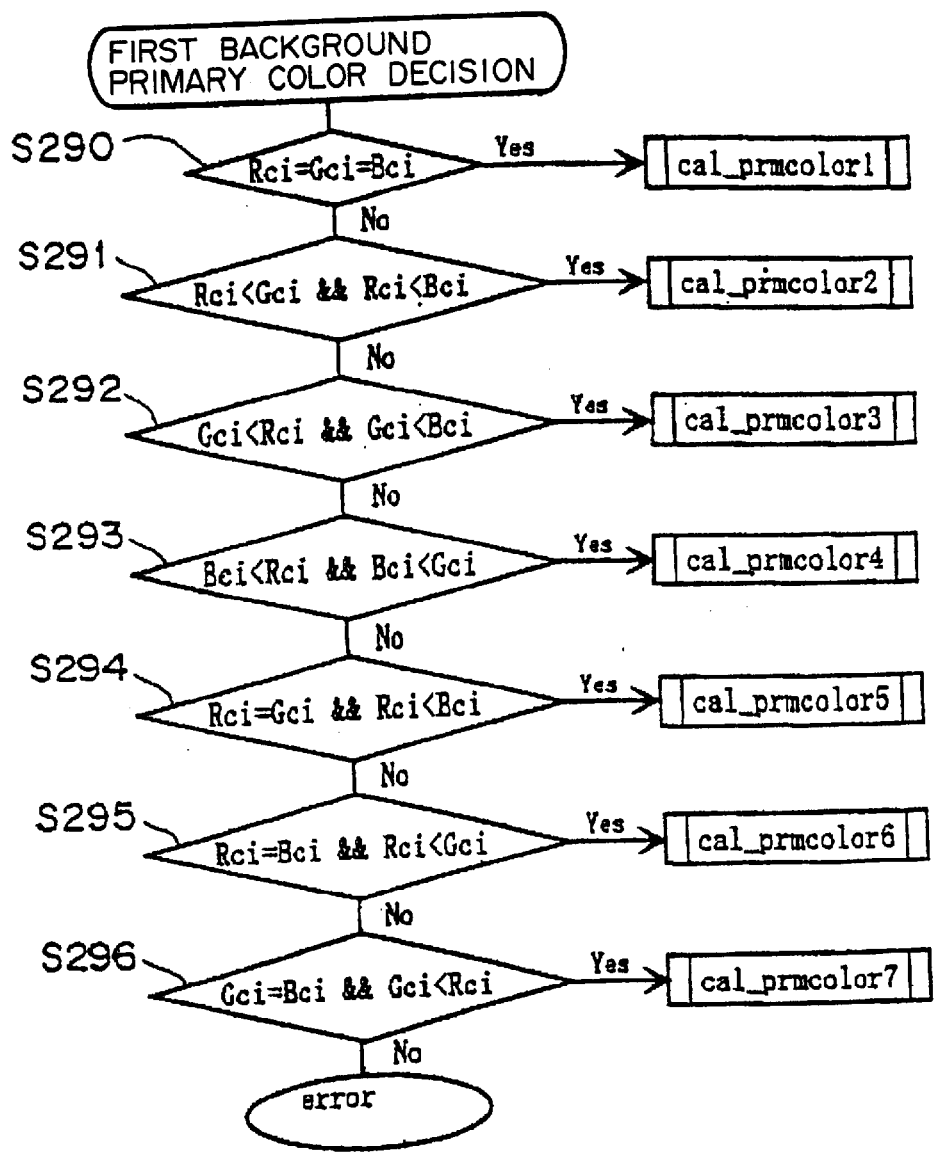
FIG. 16 is a flowchart showing the details of the process performed in a first background primary color decision step S105 of FIG. 3 (No. 1)

FIG. 16 is a flowchart showing the entire process.

First of all, it is determined whether or not all of $R_{ci}$, $G_{ci}$ and $B_{ci}$, which are obtained in FIGS. 12 through 14, are equal in step S290. If the result of the determination made in step S290 is "YES", a subroutine cal_prmcolor1 to be described later is executed. If the result of the determination made in step S290 is "NO", the process proceeds to step S291.

In step S291, it is determined whether or not $R_{ci}<G_{ci}$ and $R_{ci}<B_{ci}$ are satisfied. If the result of the determination made in step S291 is "YES", a subroutine cal_prmcolor2 to be described later is executed. If the result of the determination made in step S291 is "NO", the process proceeds to step S292.

In step S292, it is determined whether or not $G_{ci}<G_{ci}$ and $G_{ci}<B_{ci}$ are satisfied. If the result of the determination made in step S292 is "YES", a subroutine cal_prmcolor3 to be described later is executed. If the result of the determination made in step S292 is "NO", the process proceeds to step S293.

In step S293, it is determined whether or not $B_{ci}<R_{ci}$ and $B_{ci}<G_{ci}$ are satisfied. If the result of the determination made in step S293 is "YES", a subroutine cal_prmcolor4 to be described later is executed. If the result of the determination made in step S293 is "NO", the process proceeds to step S294.

In step S294, it is determined whether or not $R_{ci}=G_{ci}$ and $R_{ci}<B_{ci}$ are satisfied. If the result of the determination made in step S294 is "YES", a subroutine cal_prmcolor5 to be described later is executed. If the result of the determination made in step S294 is "NO", the process proceeds to step S295.

In step S295, it is determined whether or not $R_{ci}=B_{ci}$ and $R_{ci}<G_{ci}$ are satisfied. If the result of the determination made in step S295 is "YES", a subroutine cal_prmcolor6 to be described later is executed. If the result of the determination made in step S295 is "NO", the process proceeds to step S296.

In step S296, it is determined whether or not $R_{ci}=B_{ci}$ and $G_{ci}<R_{ci}$ are satisfied. If the result of the determination made in step S296 is "YES", a subroutine cal_prmcolor7 to be described later is executed. If the result of the determination made in step S296 is "NO", it is recognized to be an error, and warning is issued to a user.

Figure 17:
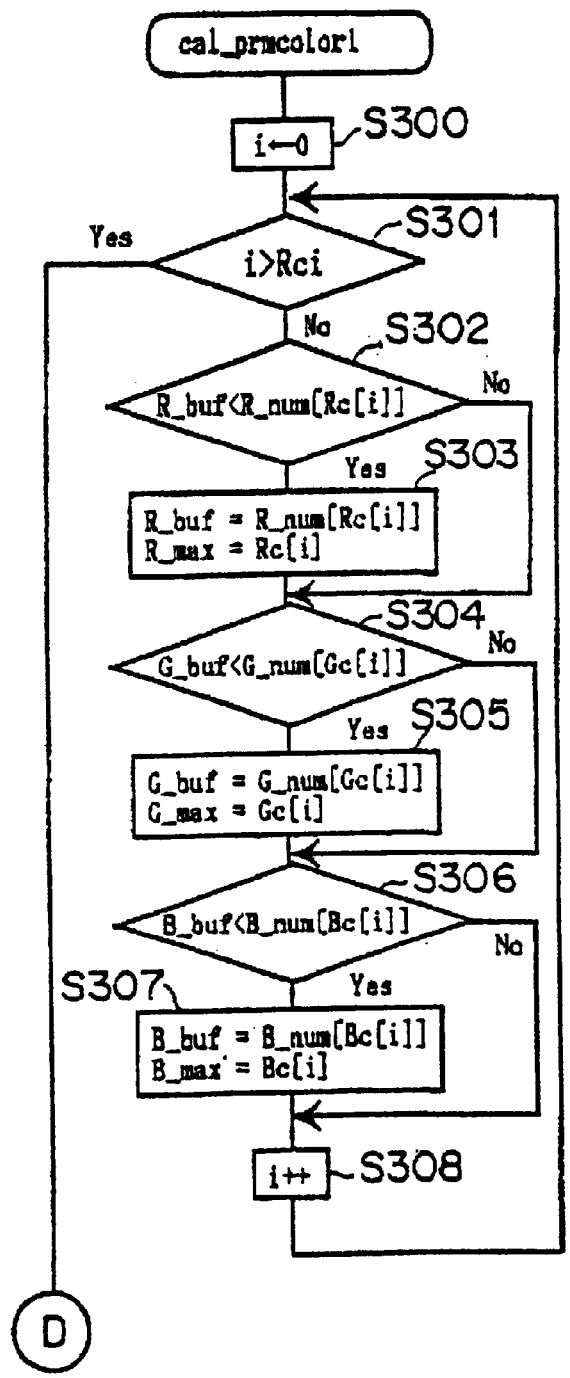
FIG. 17 is a flowchart showing the details of the process performed in the first background primary color decision step S105 of FIG. 3 (No. 2)
Figure 18:
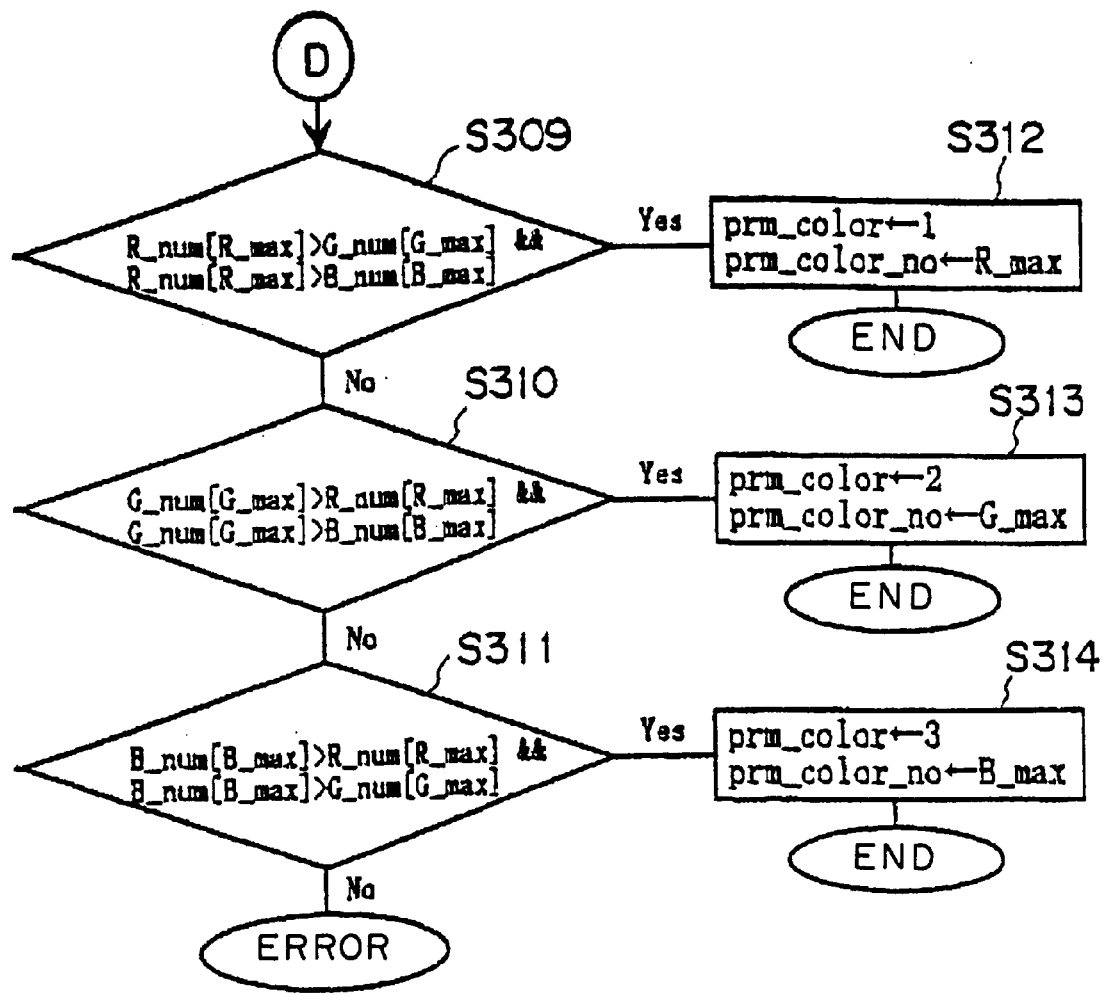
FIG. 18 is a flowchart showing the details of the process performed in the first background primary color decision step S105 of FIG. 3 (No. 3)

FIGS. 17 and 18 are flowcharts showing the process of the subroutine cal_prmcolor1.

First of all, in step S300, "i" is set to "0". Next, it is determined whether or not "i" is larger than $R_{ci}$ in step S301. If the result of the determination made in step S301 is "YES", the process proceeds to step S309. if the result of the determination made in step S301 is "NO", the process proceeds to step S302.

In step S302, it is determined whether or not a frequency value R_num[$R_c$[i]] at an "i"th maximum luminance value $R_c$[i] is larger than the buffer R_buf temporarily storing the highest frequency value. If the result of the determination made in step S302 is "YES", the process proceeds to step S304. If the result of the determination made in step S302 is "NO", the process proceeds to step S303 where R_num[$R_c$[i] is substituted for R_buf, and $R_c$[i] is substituted for R_max. The process then proceeds to step S304.

In step S304, it is determined whether or not a frequency value G_num[$G_c$[i]] at an "i"th maximum luminance value $G_c$[i] is larger than the buffer G_buf temporarily storing the highest frequency value. If the result of the determination made in step S304 is "YES", the process proceeds to step S306. If the result of the determination made in step S304 is "NO", the process proceeds to step S305 where G_num[$G_c$[i] is substituted for G_buf, and $G_c$[i] is substituted for G_max. The process then proceeds to step S306.

In step S306, it is determined whether or not a frequency value B_num[$G_c$[i]] at an "i"th maximum luminance value $B_c$[i] is larger than the buffer B_buf temporarily storing the highest frequency value. If the result of the determination made in step S306 is "YES", the process proceeds to step S308. If the result of the determination made in step S306 is "NO", the process proceeds to step S307 where B_num[$B_c$[i] is substituted for B_buf, and $B_c$[i] is substituted for B_max. The process then proceeds to step S308.

In step S308, "i" is incremented by "1", and the process goes back to step S301.

If the process proceeds from step S301 to step S309, it is determined whether or not the frequency value R_num[R_max] at R_max, which is obtained in FIG. 7, is larger than the frequency value G_num[G_max] of G_max, which is also obtained in FIG. 7, and whether or not R_num[R_max] is larger than the frequency value B_num[B_max] at B_max, which is obtained in FIG. 7. If the result of the determination made in step S309 is "YES", "1" is substituted for prm_color in step S312, and R_max is substituted for prm_color_no. Here, the process is terminated. If the result of the determination made in step S309 is "NO", the process proceeds to step S310.

In step S310, it is determined whether or not G_num[G_max]>R_num[R_max], and G_num[G_max]>B_num[B_max] are satisfied. If the result of the determination made in step S310 is "YES", "2" is substituted for prm_color, and G_max is substituted for prm_color_no in step S313. The process is then terminated. If the result of the determination made in step S310 is "NO", the process proceeds to step S311.

In step S311, it is determined whether or not B_num[B_max]>R_num[R_max], and B_num[B_max]>G_num[G_max] are satisfied. If the result of the determination made in step S311 is "YES", "3" is substituted for prm_color, and B_max is substituted for prm_color_no in step S314. The process is then terminated. If the result of the determination made in step S311 is "NO", an error process is performed. The process is then terminated.

Figure 19:
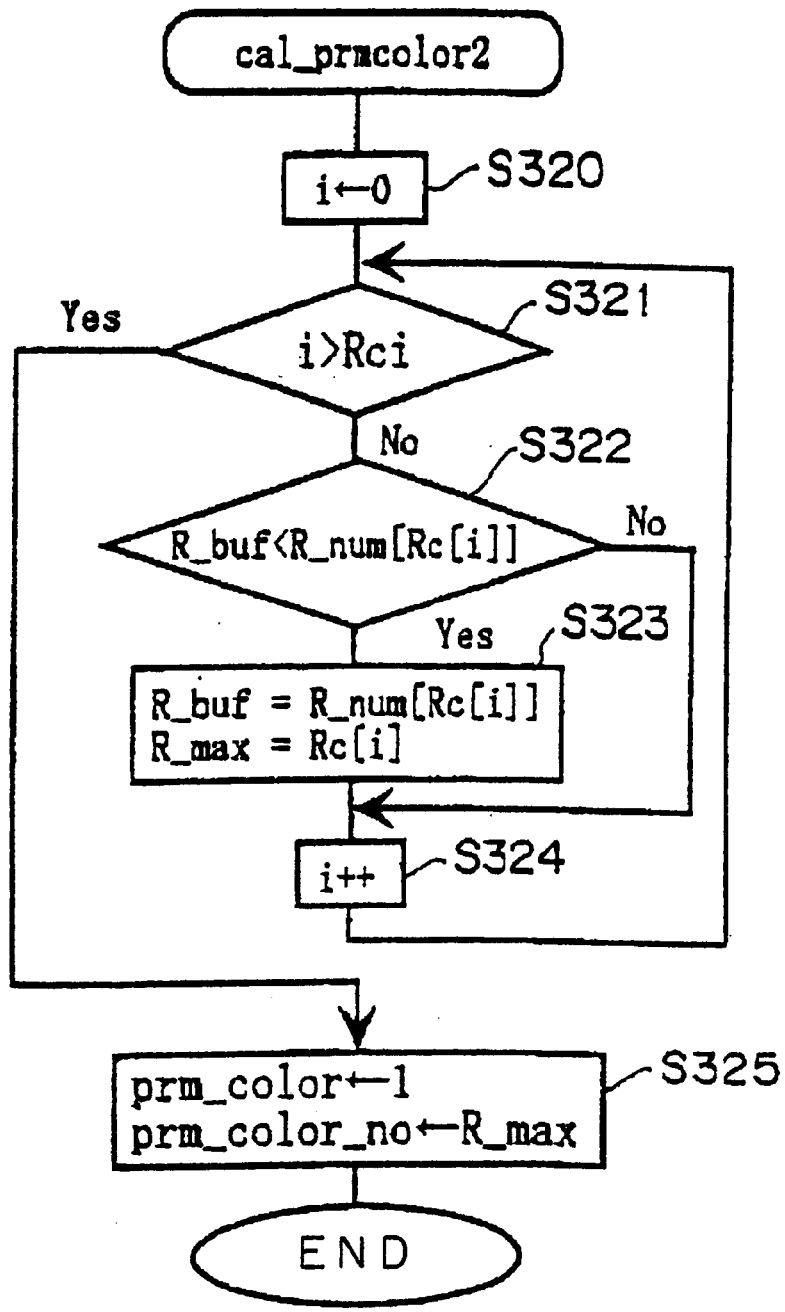
FIG. 19 is a flowchart showing the details of the process performed in the first background primary color decision step S105 of FIG. 3 (No. 4)

FIG. 19 is a flowchart showing the process of the subroutine cal_prmcolor2.

First of all, "i" is initialized to "0" in step S320. Then, in step S321, it is determined whether or not "i" is larger than $R_{ci}$. If the result of the determination made in step S321 is "YES", the process proceeds to step S325 where "1" is substituted for prm_color, and R_max is substituted for prm_color_no. Here, the process is terminated.

If the result of the determination made in step S321 is "NO", the process proceeds to step S322 where it is determined whether or not R_buf is smaller than R_num[$R_c$[I]]. If the result of the determination made in step S322 is "NO", the process proceeds to step S324 where "i" is incremented by "1". The process then goes back to step S321. If the result of the determination made in step 322 is "YES", the process proceeds to step S323 where R_num[$R_c$[i]] is substituted for R_buf, and $R_c$[i] is substituted for R_max. Then, the process proceeds to step S324 where "i" is incremented by "1". The process then goes back to step S321.

Figure 20:
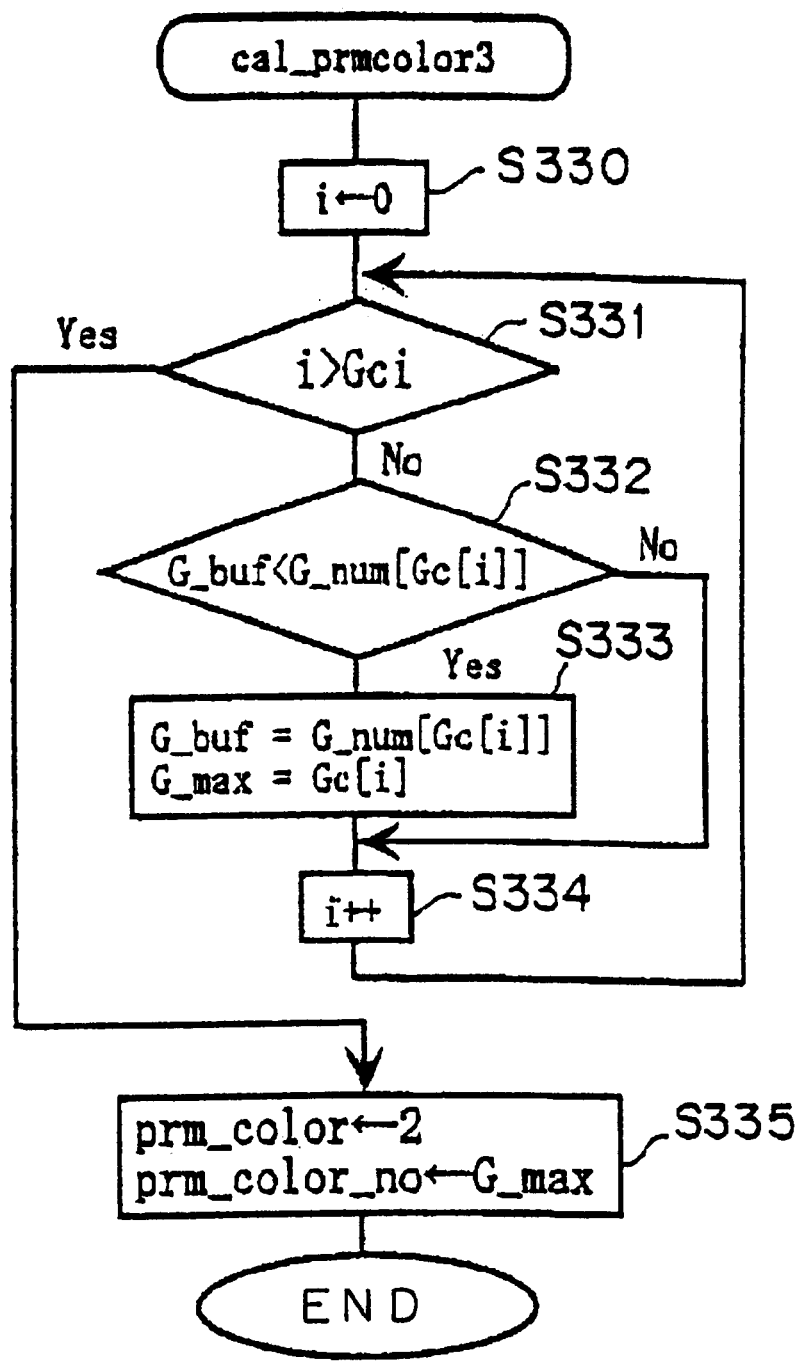
FIG. 20 is a flowchart showing the details of the process performed in the first background primary color decision step S105 of FIG. 3 (No. 5)

FIG. 20 is a flowchart showing the process of the subroutine cal_prmcolor3.

First of all, "i" is initialized to "0" in step S330. Then, in step S331, it is determined whether or not "i" is larger than $G_{ci}$. If the result of the determination made in step S331 is "YES", the process proceeds to step S335 where "2" is substituted for prm_color, and G_max is substituted for prm_color_no. Here, the process is terminated.

If the result of the determination made in step S331 is "NO", the process proceeds to step S332 where it is determined whether or not G_buf is smaller than G_num[$G_c$[i]]. If the result of the determination made in step S332 is "NO", the process proceeds to step S334 where "i" is incremented by "1". The process then goes back to step S331. If the result of the determination made in step 332 is "YES", the process proceeds to step S333 where G_num[$G_c$[i]] is substituted for G_buf, and $G_c$[i] is substituted for G_max. Then, the process proceeds to step S334 where "i" is incremented by "1". The process then goes back to step S331.

Figure 21:
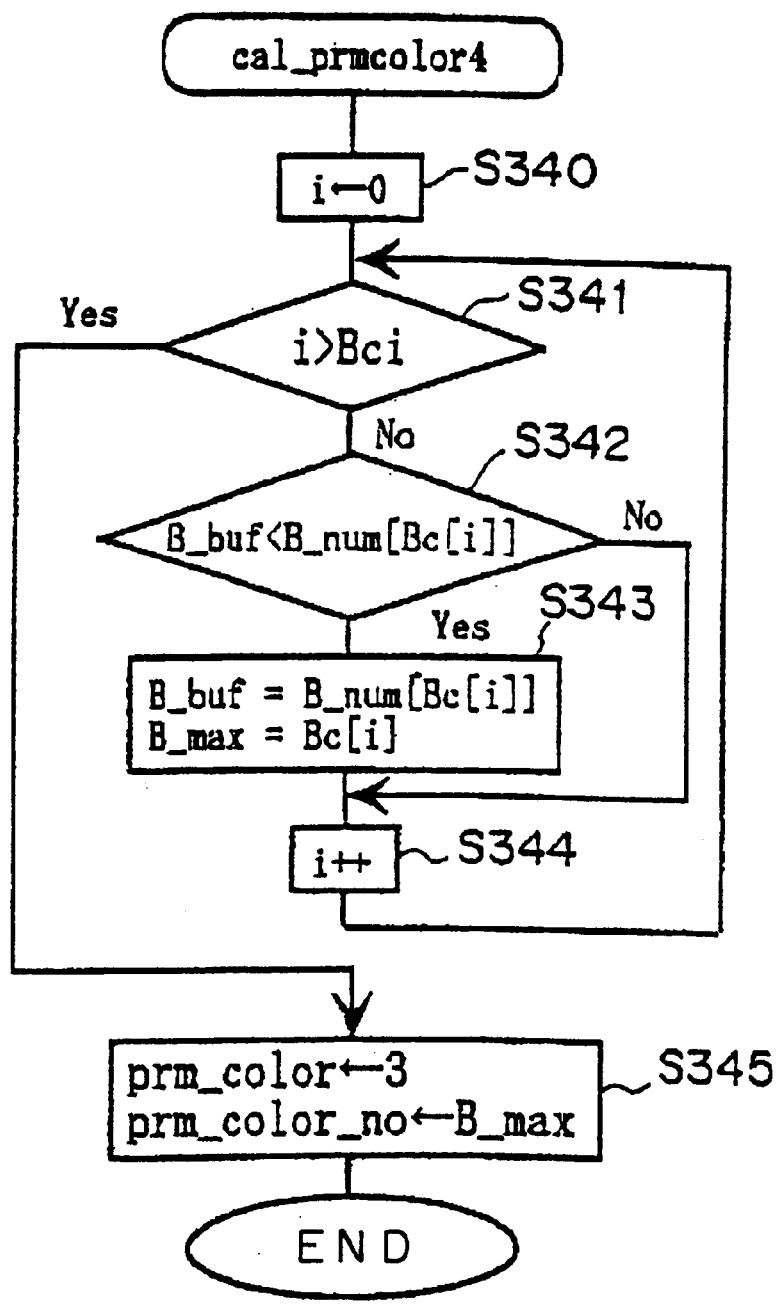
FIG. 21 is a flowchart showing the details of the process performed in the first background primary color decision step S105 of FIG. 3 (No. 6)

FIG. 21 is a flowchart showing the process of the subroutine cal_prmcolor4.

First of all, "i" is initialized to "0" in step S340. Then, in step S341, it is determined whether or not "i" is larger than $B_{ci}$. If the result of the determination made in step S341 is "YES", the process proceeds to step S345 where "3" is substituted for prm_color, and B_max is substituted for prm_color_no. Here, the process is terminated.

If the result of the determination made in step S341 is "NO", the process proceeds to step S342 where it is determined whether or not B_buf is smaller than B_num[$G_c$[i]]. If the result of the determination made in step S342 is "NO", the process proceeds to step S344 where "i" is incremented by "1". The process then goes back to step S341. If the result of the determination made in step 342 is "YES", the process proceeds to step S343 where B_num[$B_c$[i]] is substituted for B_buf, and $B_c$[i] is substituted for B_max. Then, the process proceeds to step S344 where "i" is incremented by "1". The process then goes back to step S341.

Figure 22:
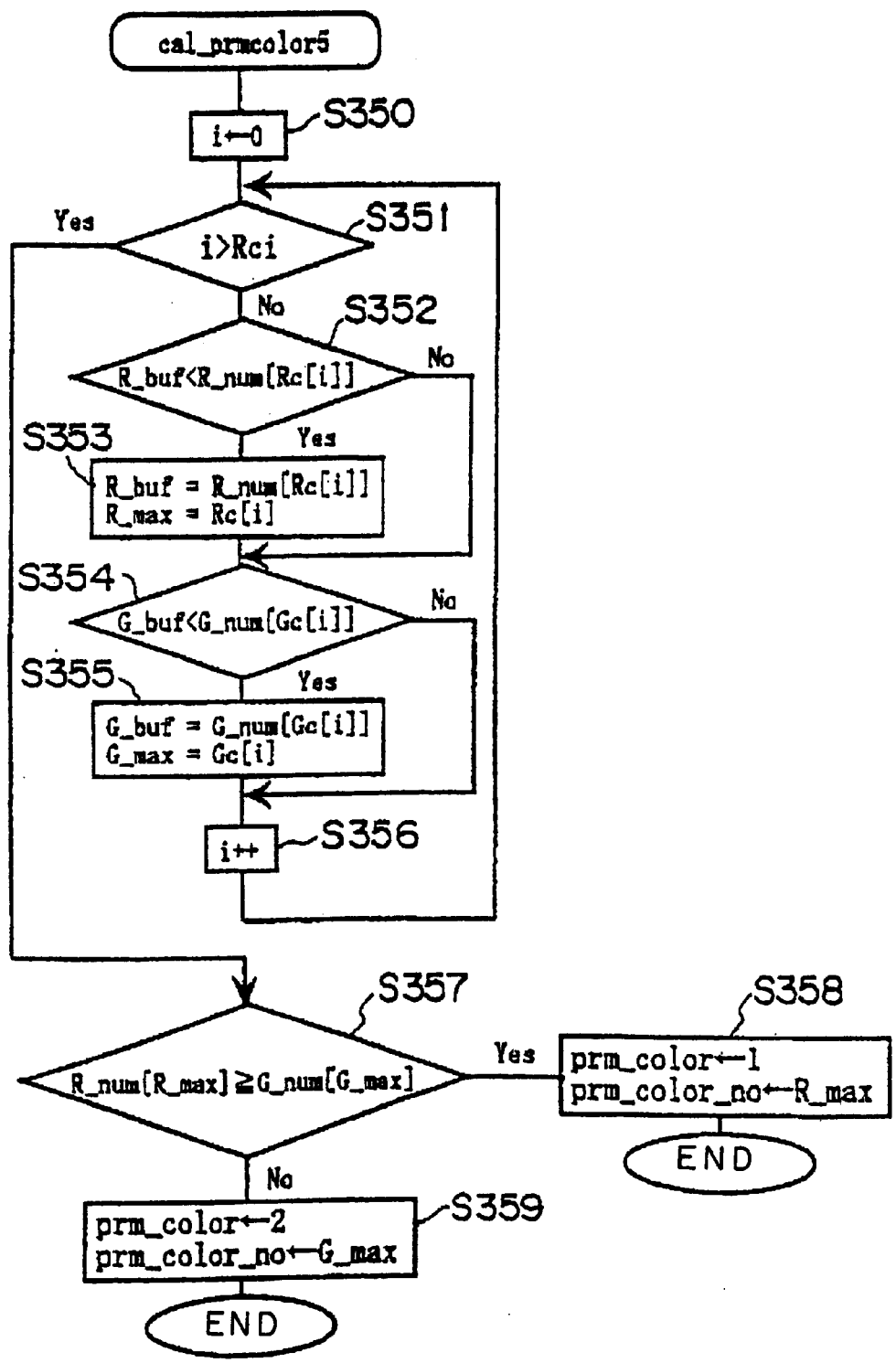
FIG. 22 is a flowchart showing the details of the process performed in the first background primary color decision step S105 of FIG. 3 (No. 7)

FIG. 22 is a flowchart showing the process of the subroutine cal_prmcolor5.

First of all, "i" is initialized to "0" in step S350. Then, in step S351, it is determined whether or not "i" is larger than $R_{ci}$. If the result of the determination made in step S351 is "YES", the process proceeds to step S357 where it is determined whether or not R_num[R_max] is equal to or larger than G_num[G_max]. If the result of the determination made in step S357 is "YES", the process proceeds to step S358 where "1" is substituted for prm_color, and R_max is substituted for prm_color_no. Here, the process is terminated. If the result of the determination made in step S357 is "NO", the process proceeds to step S359 where "2" is substituted for prm_color, and G_max is substituted for prm_color_no. The process is then terminated.

If the result of the determination made in step S351 is "NO", it is determined whether or not R_buf is smaller than R_num[$R_c$[i]] in step S352. If the result of this determination is "NO", the process proceeds to step S354. If the result of the determination is "YES", R_num[$R_c$[i]] is substituted for R_buf, and $R_c$[i] is substituted for R_max in step S353. The process then proceeds to step S354.

In step S354, it is determined whether or not G_buf is smaller than G_num[$G_c$[i]]. If the result of this determination is "NO", the process proceeds to step S356. If the result of the determination is "YES", G_num[$G_c$[i]] is substituted for G_buf, and $G_c$[i] is substituted for G_max. Then, the process proceeds to step S356.

In step S356, i" is incremented by "1". The process then goes back to step S351.

Figure 23:
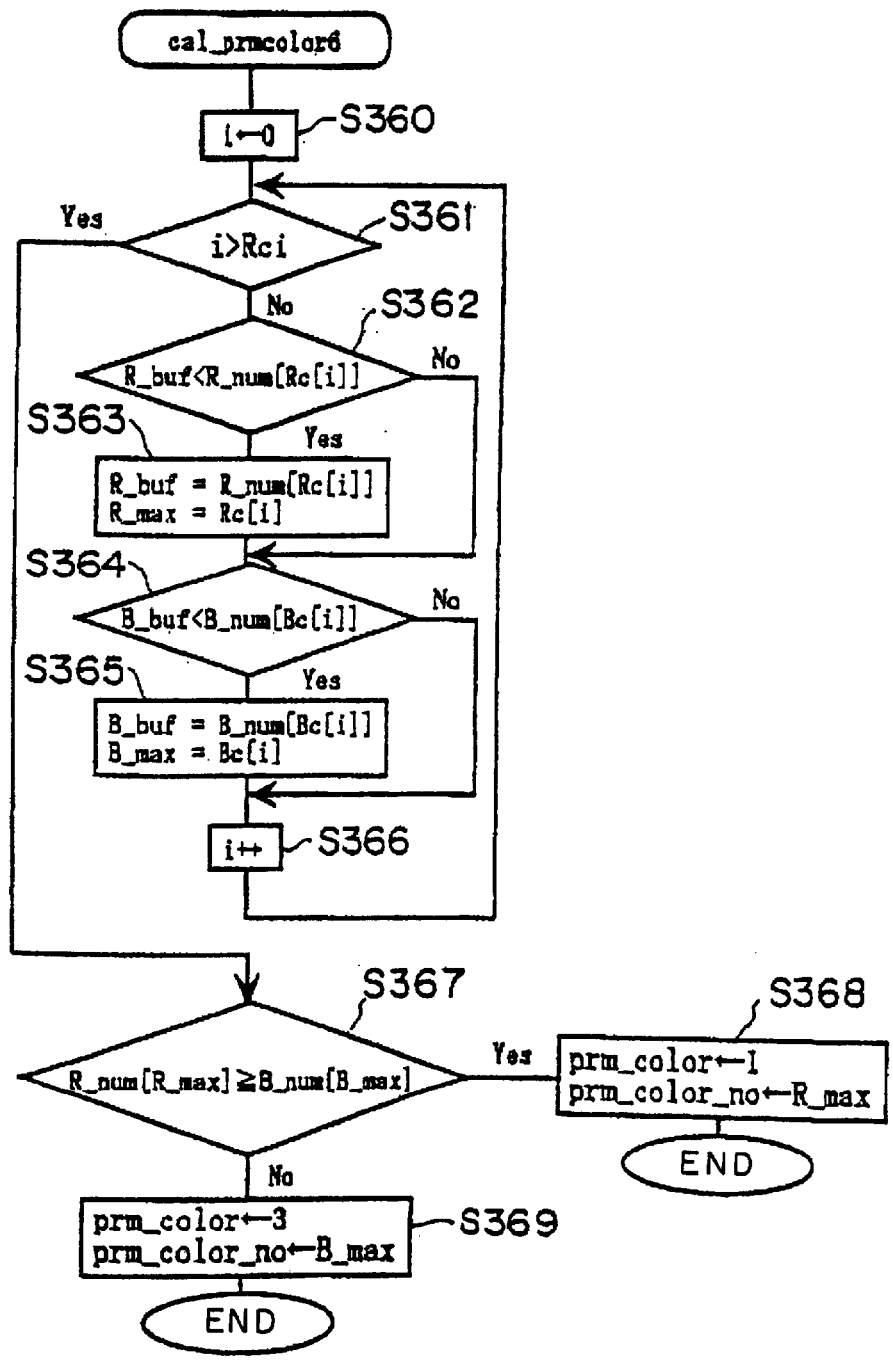
FIG. 23 is a flowchart showing the details of the process performed in the first background primary color decision step S105 of FIG. 3 (No. 8)

FIG. 23 is a flowchart showing the process of the subroutine cal_prmcolor6.

First of all, in step S360, "i" is initialized to "0". Next, in step S361, it is determined whether or not "i" is larger than $R_{ci}$. If the result of the determination made in step S361 is "YES", the process proceeds to step S367 where it is determined whether or not R_num[R_max] is equal to or larger than B_num[B_max]. If the result of the determination made in step S367 is "YES", the process proceeds to step S368 where "1" is substituted for prm_color and R_max is substituted for prm_color_no. The process is then terminated. If the result of the determination made in step S367 is "NO", "3" is substituted for prm_color, and b_max is substituted for prm_color_no in step S369. Here, the process is terminated.

If the result of the determination made in step S361 is "NO", it is determined whether or not R_buf is smaller than R_num[$R_c$[i]] in step S362. If the result of this determination is "NO", the process proceeds to step S364. If the result of the determination is "YES", R_num[$R_c$[i]] is substituted for R_buf, and $R_c$[i] is substituted for R_max in step S363. The process then proceeds to step S364.

In step S364, it is determined whether or not B_buf is smaller than B_num[$B_c$[i]]. If the result of this determination is "NO", the process proceeds to step S366. If the result of the determination is "YES", B_num[$R_c$[i]] is substituted for B_buf, and $B_c$[i] is substituted for B_max in step S365. The process then proceeds to step S366.

In step S366, "i" is incremented by 1. The process then goes back to step S361.

Figure 24:
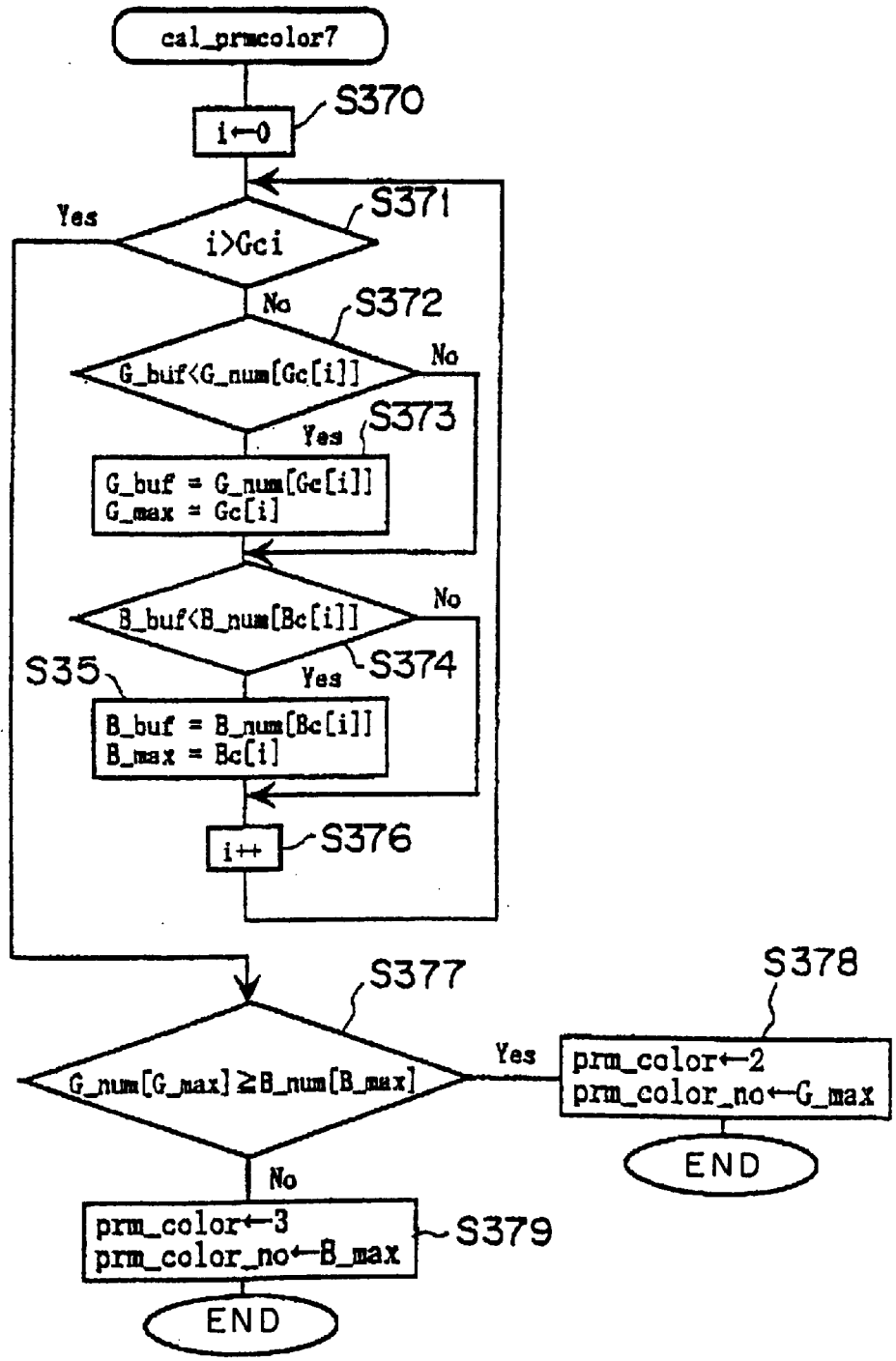
FIG. 24 is a flowchart showing the details of the process performed in the first background primary color decision step S105 of FIG. 3 (No. 9)

FIG. 24 is a flowchart showing the process of the subroutine cal_prmcolor7.

First of all, in step S370, "i" is initialized to "0". Then, in step S371, it is determined whether or not "i" is larger than $G_{ci}$. If the result of the determination made in step S371 is "YES", the process proceeds to step S377 where it is determined whether or not G_num[G_max] is equal to or larger than B_num[B_max]. If the result of the determination made in step S377 is "YES", the process proceeds to step S378 where "2" is substituted for prm_color and G_max is substituted for prm_color_no. The process is then terminated. If the result of the determination made in step S377 is "NO", "3" is substituted for prm_color, and B_max is substituted for prm_color_no in step S379. Here, the process is terminated.

If the result of the determination made in step S371 is "NO", it is determined whether or not G_buf is smaller than G_num[$G_c$[i]] in step S372. If the result of this determination is "NO", the process proceeds to step S374. If the result of the determination is "YES", G_num[$G_c$[i]] is substituted for G_buf, and $G_c$[i] is substituted for G_max in step S373. The process then proceeds to step S374.

In step S374, it is determined whether or not B_buf is smaller than B_num[$B_c$[i]]. If the result of this determination is "NO", the process proceeds to step S376. If the result of the determination is "YES", B_num[$B_c$[i]] is substituted for B_buf, and $B_c$[i] is substituted for B_max in step S375. The process then proceeds to step S376.

In step S376, "i" is incremented by 1. Then, the process goes back to step S371.

Next, pixels having a luminance value matching the first background primary color from the captured image, and luminance histograms are generated for the two primary colors other than the first background primary color from the detected pixels.

FIGS. 25 through 28 are flowcharts showing the details of the process performed in step S106 of FIG. 3.

Figure 25:
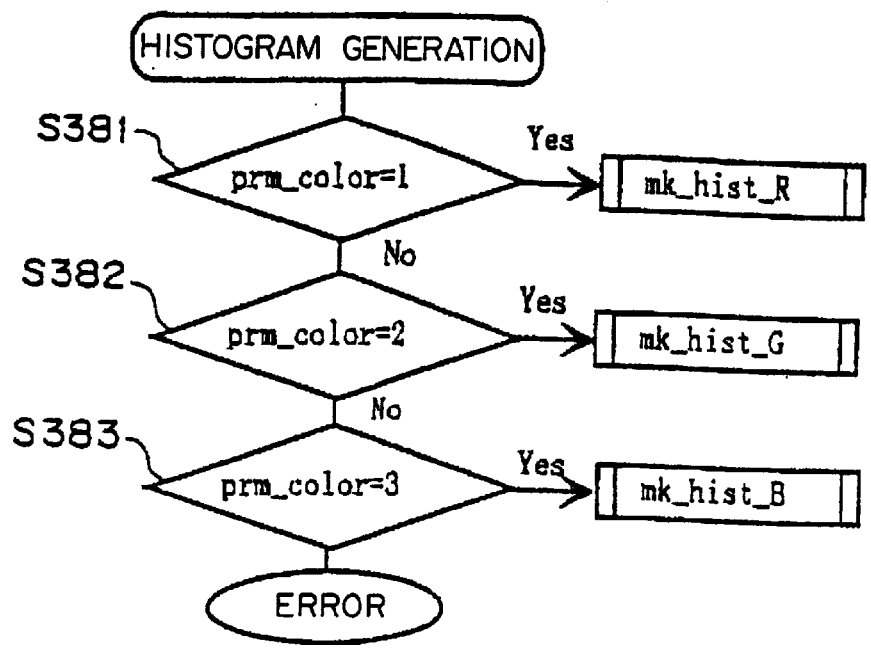
FIG. 25 is a flowchart showing the details of the process performed in step S106 of FIG. 3 (No. 1)

FIG. 25 shows the general flow of the process performed in step S106 of FIG. 3.

First of all, in step S381, it is determined whether or not prm_color is "1". If the result of this determination is "YES", a subroutine mk_hist_R to be described later is executed.

If the result of the determination made in step S381 is "NO", the process proceeds to step S382.

It is determined whether or not prm_color is "2" in step S382. If the result of the determination made in step S382 is "YES", a subroutine mk_hist_G to be described later is executed.

If the result of the determination made in step 382 is "NO", the process proceeds to step S383.

In step S383, it is determined whether or not prm_color is "3". If the result of this determination is "YES", a subroutine mk_hist_B to be described later is executed.

If the result of the determination made in step S383 is "NO", it is notified that an error has occurred, and the process is terminated.

Figure 26:
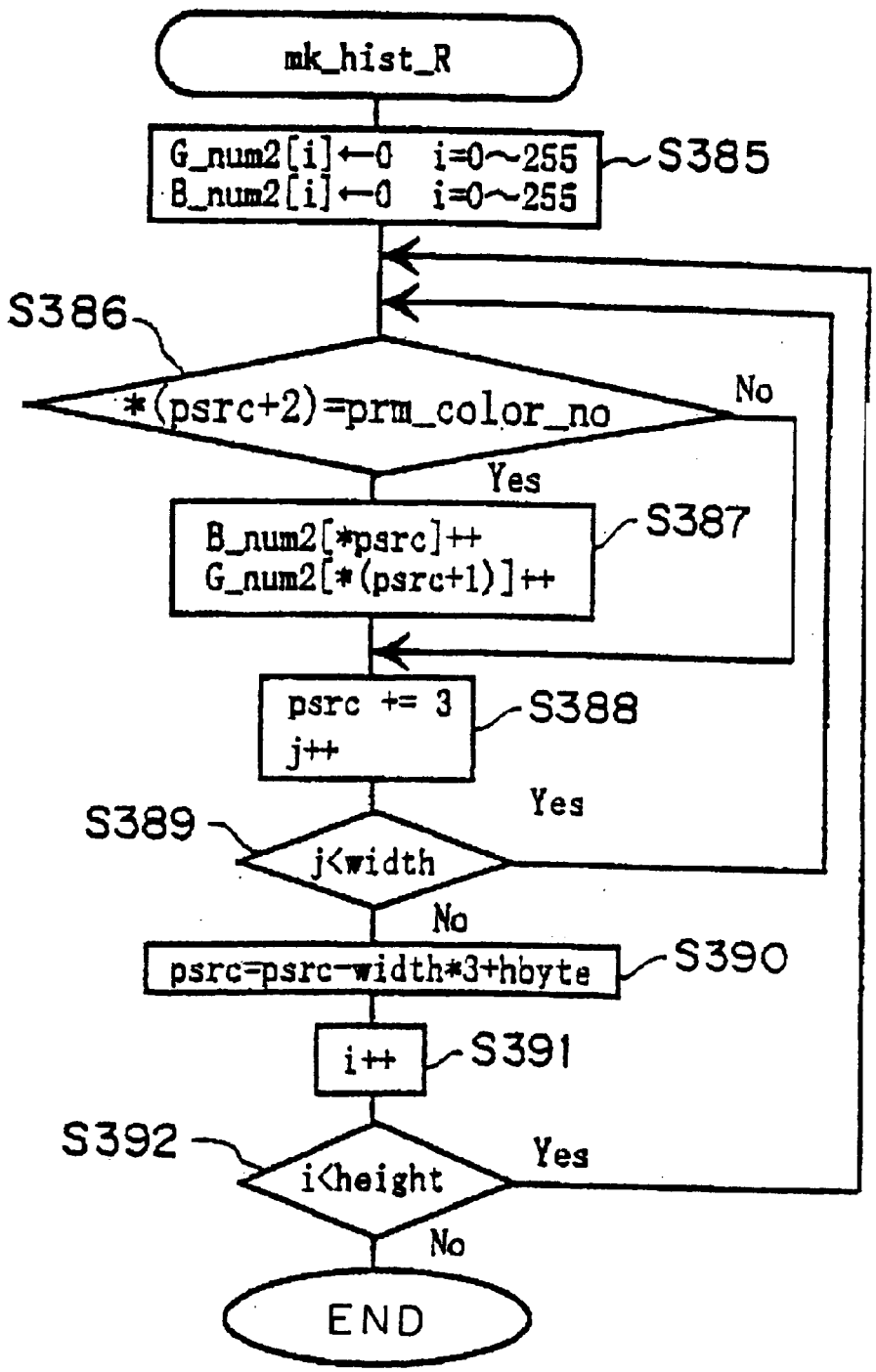
FIG. 26 is a flowchart showing the details of the process performed in step S106 of FIG. 3 (No. 2)

FIG. 26 is a flowchart showing the details of the subroutine mk_hist_R.

First of all, in step S385, arrays G_num2[i] and B_num2[i] are set to "0". Here, "i" takes a value from "0" to "255".

Next, it is determined whether or not the value *(psrc+2) of the luminance data at the address pointed to by a pointer psrc+2 is equal to prm_color_no in step S386. If the result of this determination is "NO", the process proceeds to step S388. If the result of the determination is "YES", B_num2[*(psrc)] and G_num2[*(psrc+1)] are respectively incremented by "1" in step S387. This is the process generating the histograms for the other primary colors "B" and "G" for the pixels having the luminance value prm_color_no of the first background primary color which is equal to the luminance value *(psrc+2) of the primary color "R" in the case where the first background primary color is "R".

Next, "prsc" is incremented by "3", and "j" is incremented by "1" in step S388. The process then proceeds to step S389 where it is determined whether or not "j" is smaller than the image width "width". If the result of this determination is "YES", the process goes back to step S386. If the result of the determination is "NO", the process proceeds to step S390. In step S390, the position of the pointer "psrc" is set to the beginning of the line above 1 line. This is as explained in step S206 of FIG. 5.

Then, "i" is incremented by "1" in step S391 (here, "i" is used as a variable indicating the line number currently being processed). Then, it is determined whether or not "i" is smaller than the height "height" of the image in step S392. If the result of this determination is "YES", image data yet to be processed is left. The process therefore goes back to step S386, and the process is continued. If the result of the determination made in step S392 is "NO", the process is terminated.

Figure 27:
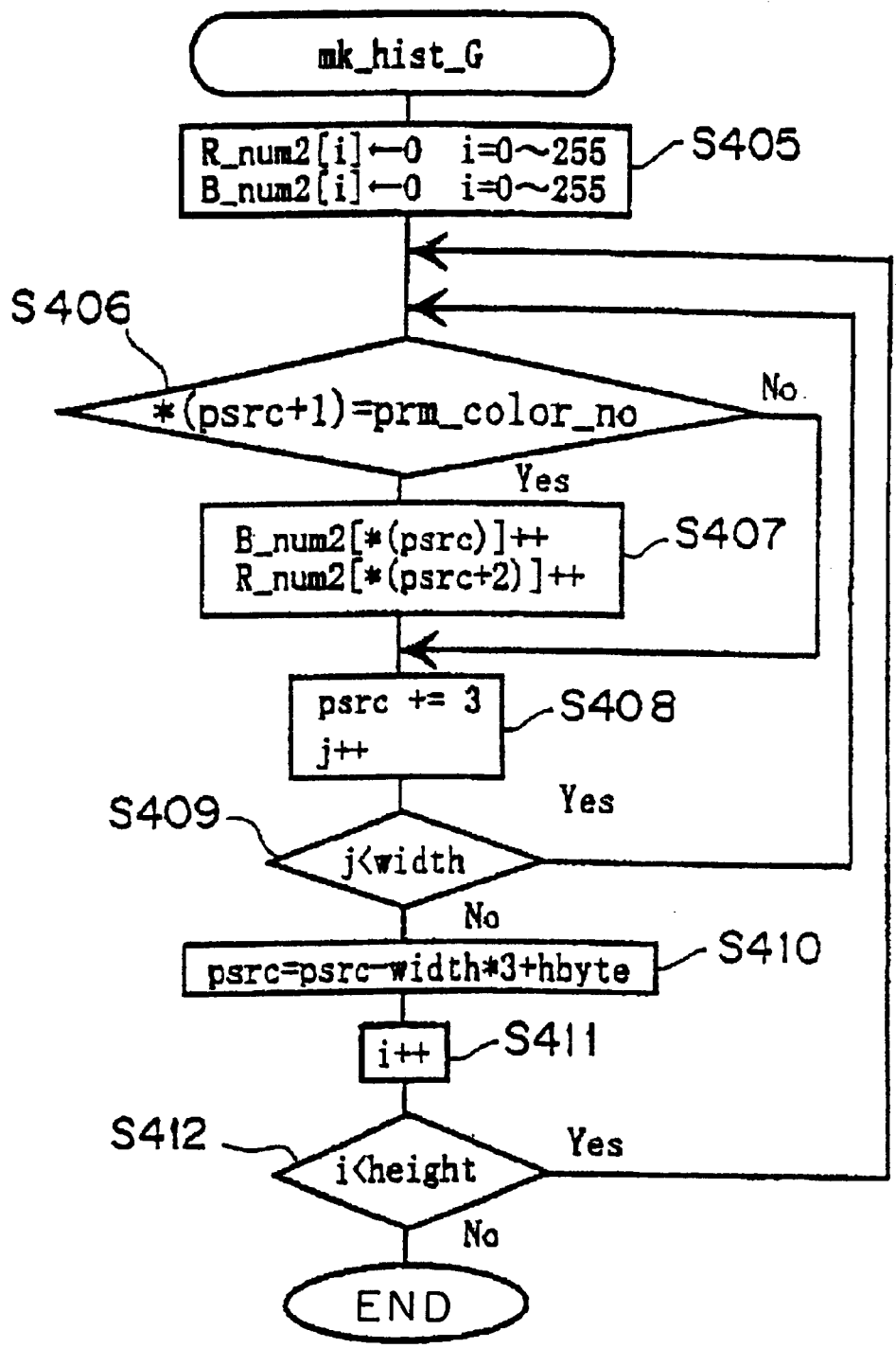
FIG. 27 is a flowchart showing the details of the process performed in step S106 of FIG. 3 (No. 3)

FIG. 27 is a flowchart showing the details of the subroutine mk_hist_G.

First of all, in step S405, arrays R_num2[i] and B_num2[i] are set to "0". Here, "i" takes a value from "0" to "255".

Next, in step S406, it is determined whether or not the value *(psrc+1) of the luminance data at the address pointed to by the pointer psrc+1 is equal to prm_color_no. If the result of this determination is "NO", the process proceeds to step S408. If the result of the determination is "YES", B_num2[*(psrc)] and G_num2[*(psrc+1)] are respectively incremented by "1" in step S407. This is the process generating the histograms for the other primary colors "B" and "R" for the pixels having the luminance value prm_color_no of the first background primary color is equal to the luminance value *(psrc+1) of the primary color "G" in the case where the first background primary color is "G".

Next, "prsc" is incremented by "3" in step S408, and "j" is incremented by "1" in step S408. The process then proceeds to step S409. In step S409, it is determined whether or not "j" is smaller than the image width "width". If the result of this determination is "YES", the process goes back to step S406. If the result of the determination is "NO", the process proceeds to step S410 where the position of the pointer "psrc" is set to the beginning of a line above 1 line. This is as explained in step S206 of FIG. 5.

In step S411, "i" is incremented by "1" (here, "i" is used as a variable indicating the line number currently being processed). Then, it is determined whether or not "i" is smaller than the image height "height" in step S412. If the result of this determination is "YES", image data yet to be processed is left. The process therefore goes back to step S406, and the process is continued. If the result of the determination made in step S412 is "NO", the process is terminated.

Figure 28:
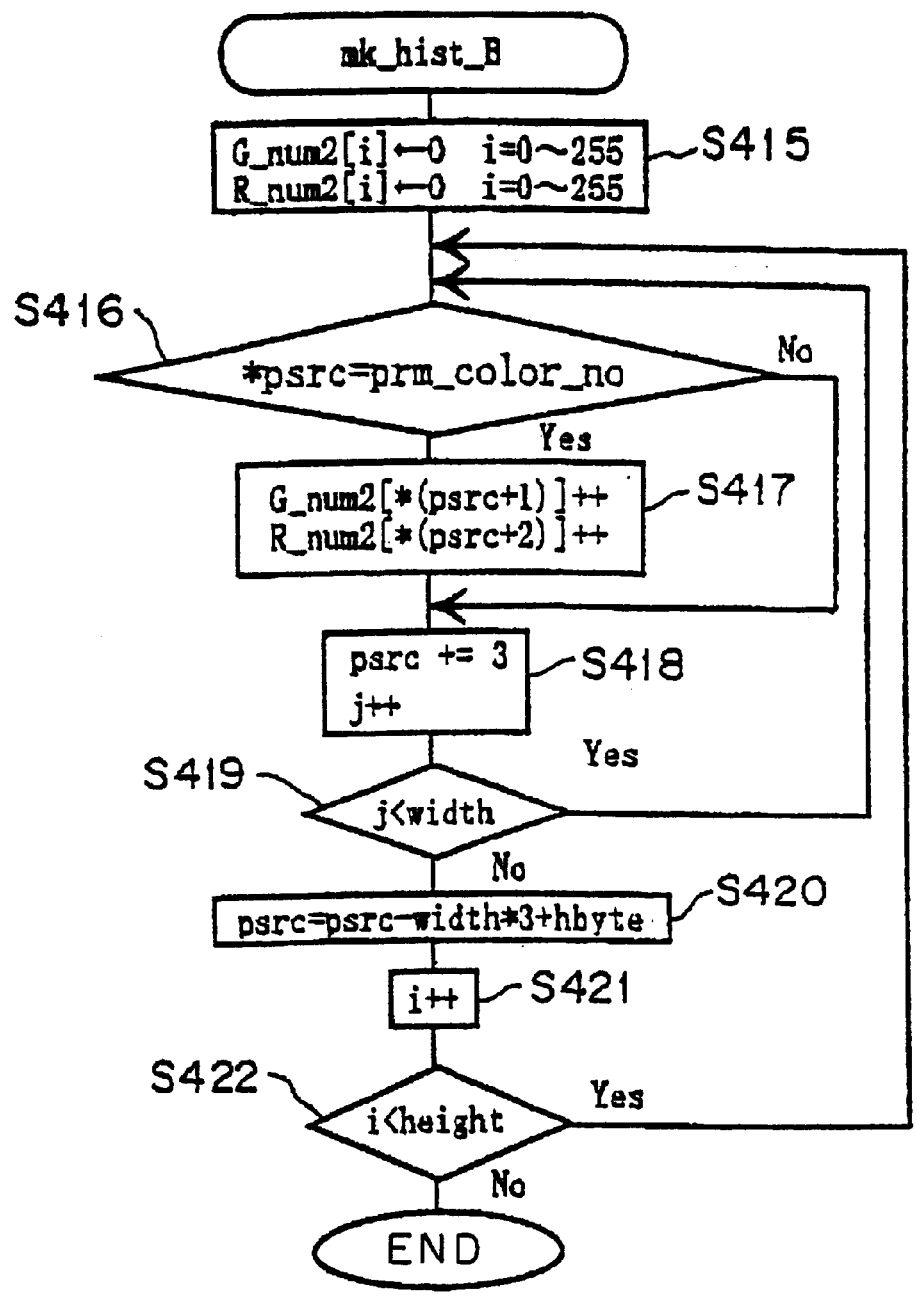
FIG. 28 is a flowchart showing the details of the process performed in step S106 of FIG. 3 (No. 4)

FIG. 28 is a flowchart showing the details of the subroutine mk_hist_B.

First of all, in step S415, arrays R_num2[i] and G_num2[i] are set to "0". Here, "i" takes a value from "0" to "255".

Next, it is determined whether or not the value *psrc of the luminance data at the address pointed to by the pointer "psrc" is equal to prm_color_no in step S416. If the result of this determination is "NO", the process proceeds to step S418. If the result of the determination is "YES", R_num2[*psrc+2)] and G_num2[*psrc+1)] are respectively incremented by "1". This is the process generating the histograms for the other primary colors "G" and "R" for the pixels having the luminance value prm_color_no of the first background primary color is equal to the luminance value *(psrc) of the primary color "B" in the case where the first background primary color is "B".

Next, in step S418, "prsc" is incremented by "3", and "j" is incremented by "1". The process then proceeds to step S419 where it is determined whether or not "j" is smaller than the image width "width". If the result of this determination is "YES", the process goes back to step S416. If the result of the determination is "NO", the process proceeds to step S420. In step S420, the position of the pointer "psrc" is set to the beginning of the line above 1 line. This is as explained in step S206 of FIG. 5.

Then, in stp S421, "i" is incremented by "1" (here, "i" is used as a variable indicating the line number currently being processed). Then, it is determined whether or not "i" is smaller than the image height "height" in step S422. If the result of this determination is "YES", image data yet to be processed is left. The process therefore goes back to step S416, and the process is continued. If the result of the determination made in step S422 is "NO", the process is terminated.

FIGS. 29 through 32 are flowcharts showing the details of the process performed in step S107 of FIG. 3.

The most frequent values of luminance values within the same luminance areas as the background candidate luminance area detected from the histogram generated as described above are decided to be the background second and third primary colors, and background colors $R_b$, $G_b$, and $B_b$ are decided.

Figure 29:
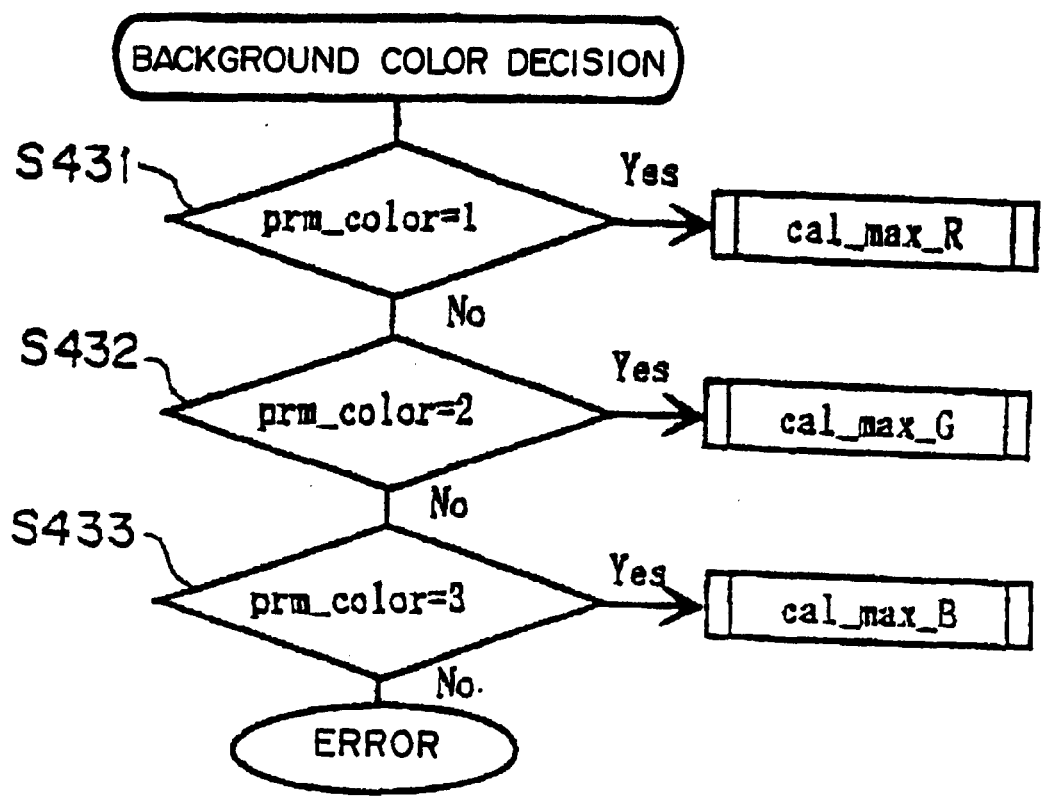
FIG. 29 is a flowchart showing the details of the process performed in step S107 of FIG. 3 (No. 1)

FIG. 29 shows the general flow of the background color decision process.

First of all, in step S431, it is determined whether or not prm_color is "1". If the result of this determination is "YES", a subroutine cal_max_R to be described later is executed.

If the result of the determination made in step S431 is "NO", the process proceeds to step S432.

In step S432, it is determined whether or not prm_color is "2" in step S432. If the result of this determination is "YES", a subroutine cal_max_G to be described later is executed.

If the result of the determination made in step S432 is "NO", the process proceeds to step S433.

In step S433, it is determined whether or not prm_color is "3". If the result of this determination is "YES", a subroutine cal_max_B to be described later is executed.

If the result of the determination made in step S433 is "NO", it is notified that an error has occurred, and the process is terminated.

Figure 30:
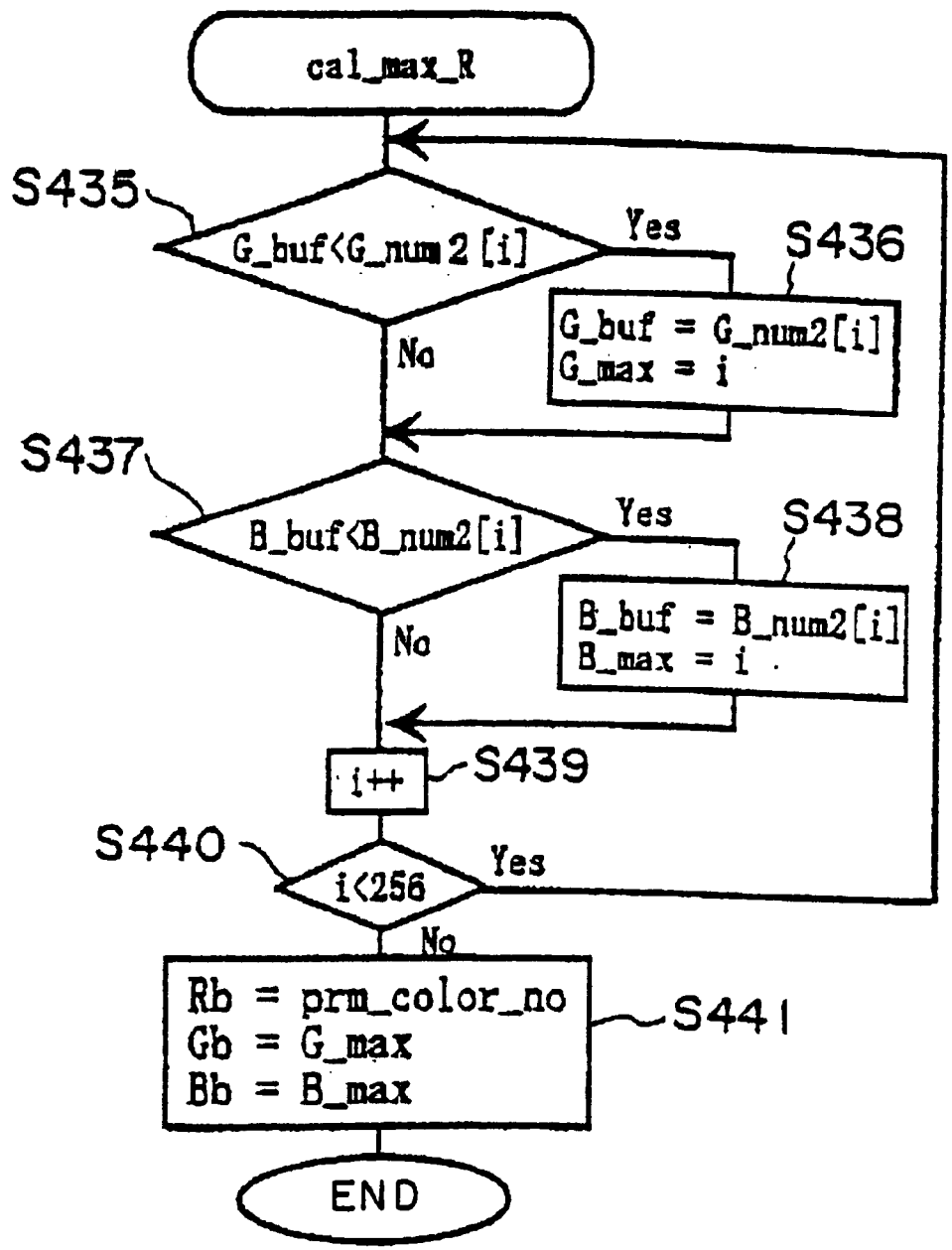
FIG. 30 is a flowchart showing the details of the process performed in step S107 of FIG. 3 (No. 2)

FIG. 30 is a flowchart showing the details of the subroutine cal_max_R.

First of all, in step S435, it is determined whether or not G_buf is smaller than G_num2 [i]. If the result of this determination is "NO", the process proceeds to step S437. If the result of the determination made in step S435 is "YES", the process proceeds to step S436 where G_num2[i] is substituted for G_buf, and "i" is substituted for G_max. The process then proceeds to step S437.

In step S437, it is determined whether or not B_buf is smaller than B_num2[i]. If the result of this determination is "NO", the process proceeds to step S439. If the result of the determination made in step S437 is "YES", the process proceeds to step S438 where B_num2[i] is substituted for B_buf, and "i" is substituted for B_max. The process then proceeds to step S439.

In step S439, "i" is incremented by "1". In step S440, it is determined whether or not "i" is smaller than "256". If the result of the determination made in step S440 is "YES", it means that the process is not completed for all of luminance values. The process therefore goes back to step S435, and the process is continued. If the result of the determination made in step S440 is "NO", prm_color_no, G_max, and B_max are respectively substituted for $R_b$, $G_b$, and $B_b$ in step S441. Here, the process is terminated.

Figure 31:
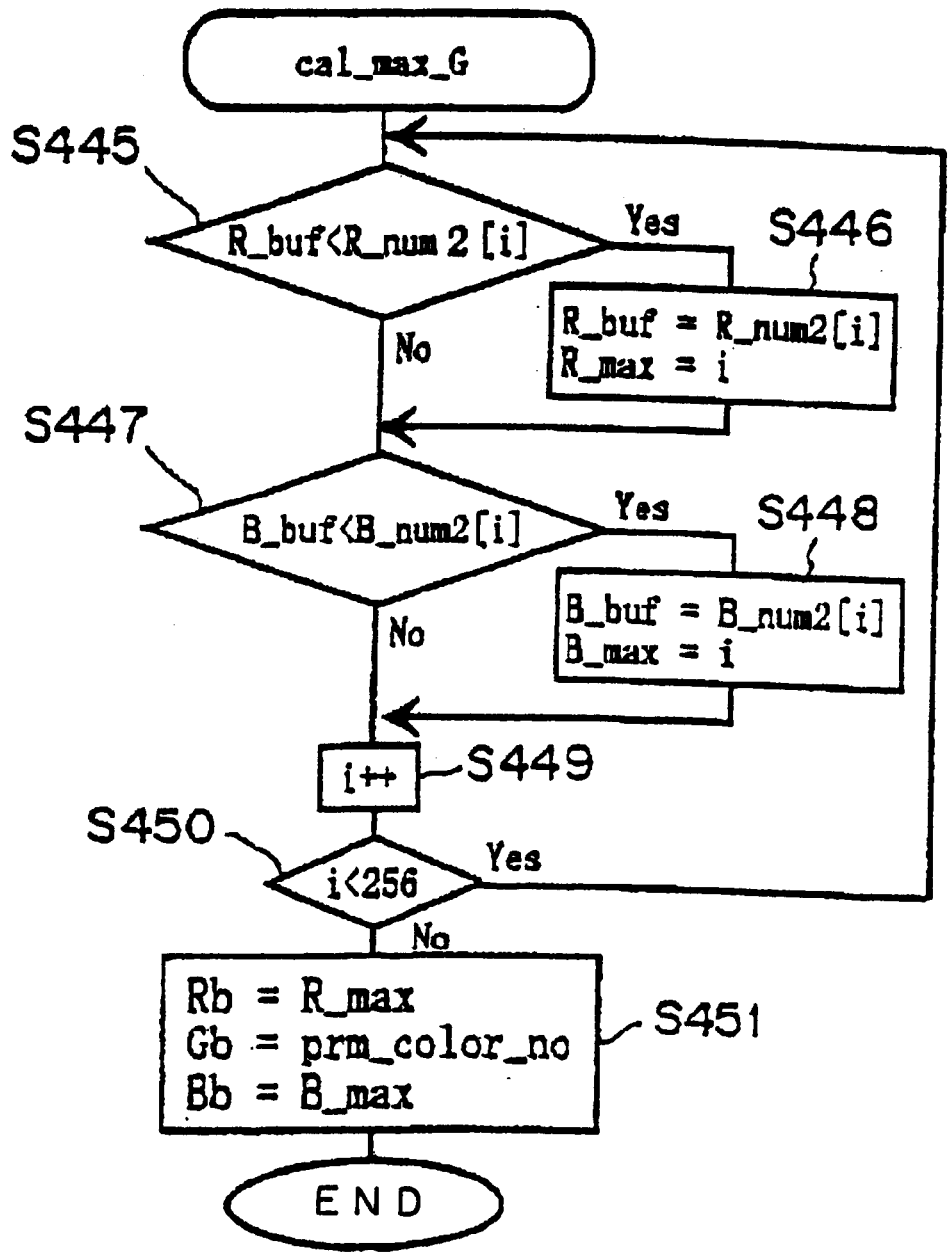
FIG. 31 is a flowchart showing the details of the process performed in step S107 of FIG. 3 (No. 3)

FIG. 31 is a flowchart showing the details of the subroutine cal_max_G.

First of all, in step S445, it is determined whether or not R_buf is smaller than R_num2 [i]. If the result of this determination is "NO", the process proceeds to step S447. If the result of the determination made in step S445 is "YES", the process proceeds to step S446 where R_num2[i] is substituted for R_buf, and "i" is substituted for R_max. The process then proceeds to step S447.

Instep S447, it is determined whether or not B_buf is smaller than B_num2[i]. If the result of this determination is "NO", the process proceeds to step S449. If the result of the determination made in step S447 is "YES", the process proceeds to step S448 where B_num2[i] is substituted for B_buf, and "i" is substituted for B_max. The process then proceeds to step S449.

In step S449, "i" is incremented by "1". In step S450, it is determined whether or not "i" is smaller than "256". If the result of the determination made in step S450 is "YES", it means that the process is not completed for all of luminance values. The process therefore goes back to step S445, and the process is continued. If the result of the determination made in step S450 is "NO", prm_color_no, R_max, and B_max are respectively substituted for $G_b$, $R_b$, and $B_b$. Here, the process is terminated.

Figure 32:
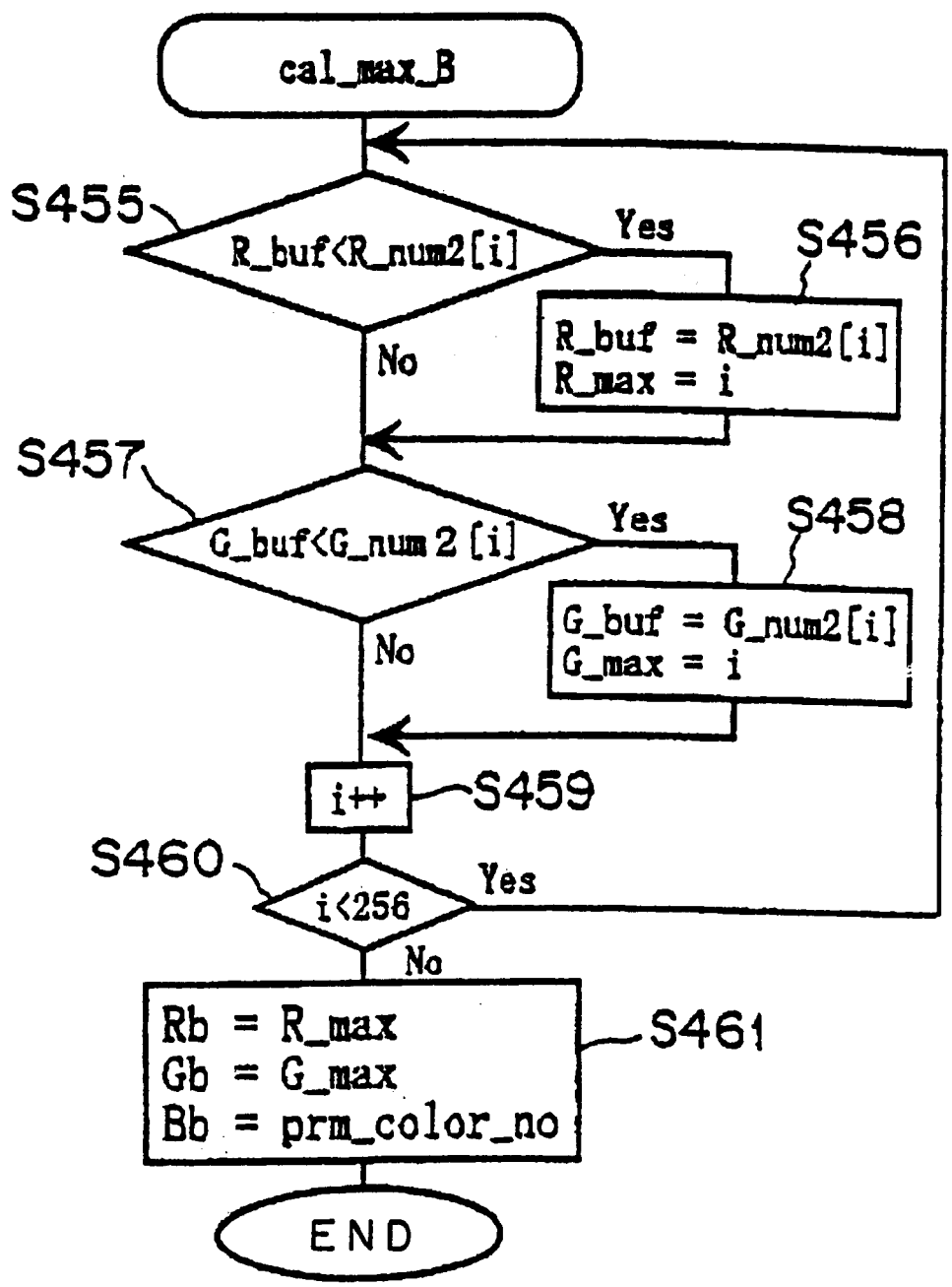
FIG. 32 is a flowchart showing the details of the process performed in step S107 of FIG. 3 (No. 4)

FIG. 32 is a flowchart showing the details of the subroutine cal_max_B.

In step S455, it is determined whether or not R_buf is smaller than R_num2[i]. If the result of this determination is "NO", the process proceeds to step S457. If the result of the determination made in step S455 is "YES", the process proceeds to step S456 where R_num2[i] is substituted for R_buf, and "i" is substituted for R_max. The process then proceeds to step S457.

In step S457, it is determined whether or not G_buf is smaller than G_num2[i]. If the result of the determination made in step S457 is "NO", the process proceeds to step S459. If the result of the determination made in step S457 is "YES", the process proceeds to step S458 where G_num2 [i] is substituted for G_buf, and "i" is substituted for G_max. The process then proceeds to step S459.

In step S459, "i" is incremented by "1". Then, in step S460, it is determined whether or not "i" is smaller than "256". If the result of the determination made in step S460 is "YES", it means that the process is not completed for all of luminance values. The process therefore goes back to step S455, and the process is continued. If the result of the determination made in step S460 is "NO", prm_color_no, R_max, and G_max are respectively substituted for $B_b$, $R_b$, and $G_b$. Here, the process is terminated.

Next, pixels having luminance values within a background candidate luminance area are detected from a captured image as background pixels for the image data input to the image processing unit during this scanning.

Figure 33:
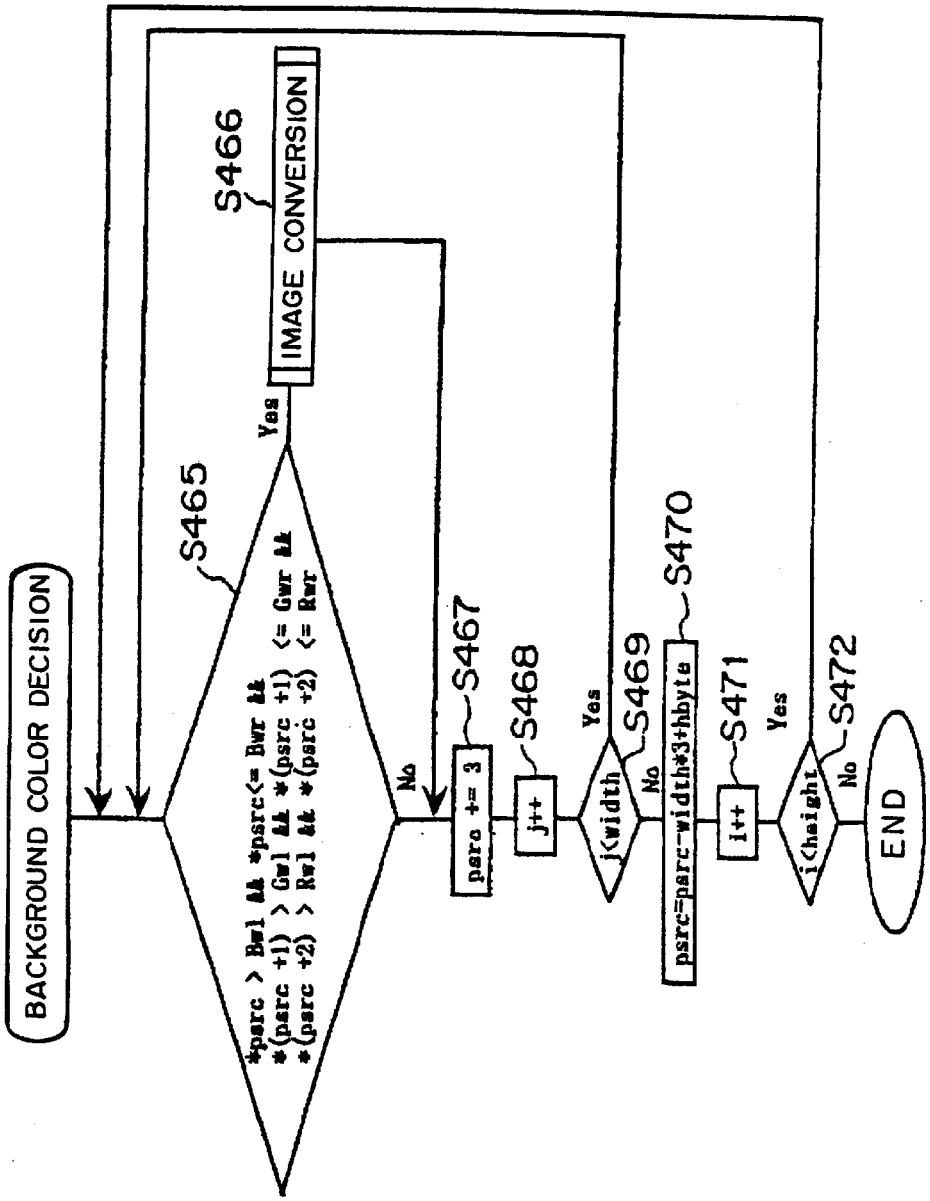
FIG. 33 is a flowchart showing the details of the process performed in step S108 of FIG. 3.

FIG. 33 is a flowchart showing the details of the process performed in step S108 of FIG. 3.

First of all, the following expressions are evaluated in step S465.

*psrc>$B_{wl}$, and, *psrc$\leq B_{wr}$, and, *(psrc+1)>$G_{wl}$, and, *(psrc+1)$\leq G_{wr}$, and, *(psrc+2)>$R_{wl}$, and, *(psrc+2)$\leq R_{wr}$ These evaluation expressions are intended to determine whether or not the RGB values of image data are within the luminance ranges of the background candidate luminance areas respectively obtained for "R", "G", and "B". Namely, these expressions are intended to determine $R_{wl}<R\leq R_{wr}$, $G_{wl}<G\leq G_{wr}$, and $B_{wl}<B\leq B_{wr}$.

If the result of the determination made in step s465 is "NO", the process proceeds to step S467. If the result of the determination made in step S465 is "YES", the process proceeds to step S466 where an image conversion operation is performed. The process then proceeds to step S467.

In step S467, the pointer "psrc" is incremented by "3", and the process proceeds to step S468 where "j" is incremented by "1". In step S469, it is determined whether or not "j" is smaller than the image width "width". If the result of the determination made in step S469 is "YES", it means that the process has not been completed yet for the whole of one line. The process therefore goes back to step S465, and is repeated. If the result of the determination made in step S469 is "NO", the position of the pointer "prsc" is moved to the beginning of the line above one line. This is as explained in step S206 of FIG. 5.

Next, in step S471, "i" is incremented by "1". In step S472, it is determined whether or not "i" is smaller than the image height "height". If the result of the determination made in step S472 is "YES", it means that the process has not been completed yet for the entire image data. The process therefore goes back to step S465, and is repeated. If the result of the determination made in step S472 is "NO", the process is terminated.

Lastly, an image from which a reverse-side visible portion is removed is produced by converting the colors of the detected background pixels into the background colors $R_b$, $G_b$, and $B_b$. The image data for which the reverse-side visibility removal process is performed is stored in the buffer memory 11 (refer to FIG. 1).

Figure 34:
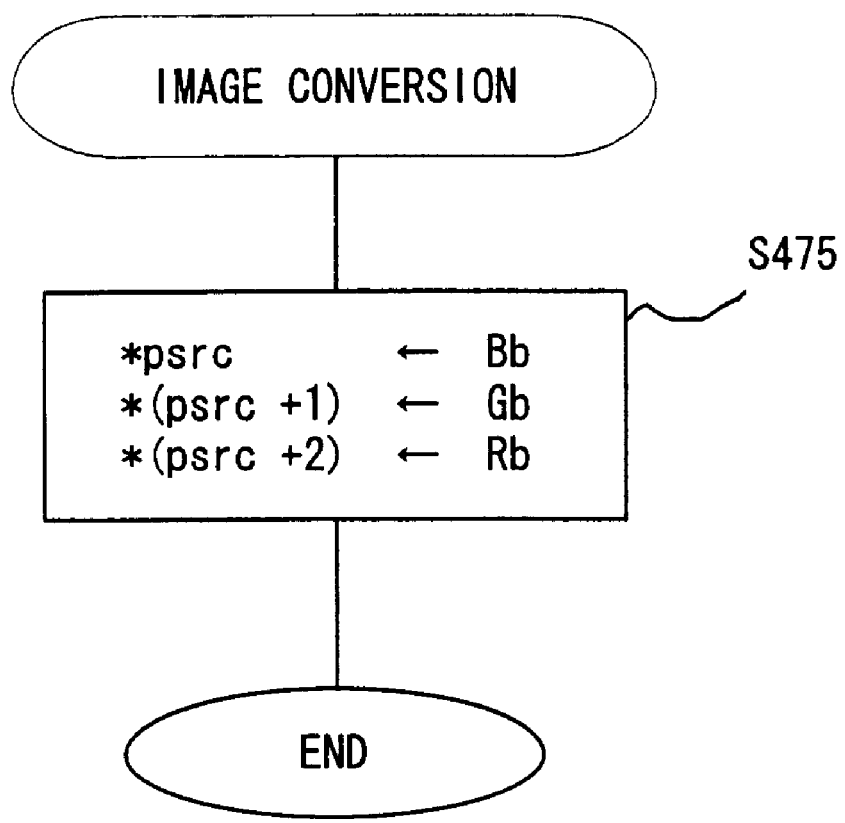
FIG. 34 is a flowchart showing the details of the process performed in step S109 of FIG. 3, and the process performed in step S466 of FIG. 33.

FIG. 34 is a flowchart showing the details of the process performed in step S109 of FIG. 3, and the process performed in step S466 of FIG. 33.

In the image conversion process, the luminance values of the three primary colors of background candidate luminance areas are replaced with background colors $R_b$, $G_b$, and $B_b$. That is, $B_b$, $G_b$, and $R_b$ are respectively substituted for *psrc, *(psrc+1), and (psrc+2) in step S475 so as to replace the luminance values. This step is a process performed when pixels currently being processed are within the background candidate luminance area in FIG. 33. Accordingly, the background colors can be replaced by performing the processes shown in FIGS. 33 and 34.

In the above described preferred embodiment, the reverse-side visibility removal process is performed when an entire image is captured. However, if a limitation is imposed on the transfer speed to a buffer memory, or if a large amount of time is required to perform the reverse-side visibility removal process, the process may be performed for each line. Additionally, if image signals are stored from the buffer memory 11 onto the storage medium 12, the reverse-side visibility removal process may be performed for the image data for one page, which is stored onto the storage medium 12.

As described above, image data for one page is captured by reading the image signals stored in the buffer memory 11, and by sequentially storing them onto the storage medium 12 such as a magnetic storage medium, etc.

Additionally, the three primary colors "R", "G", and "B" are used as the primary colors of a captured image in the above described preferred embodiment. However, the present invention is not limited to these primary colors. "C", "M", "Y", and "K" may be used as the primary colors for the processing. In this case, a printer is allowed to perform the reverse-side visibility removal process. An example of an implementation using the CMYK values may easily be configured by a person having ordinary skill in the art, if the above described preferred embodiment is referenced.

Furthermore, the above described preferred embodiment is explained by assuming a scanner. However, the image producing device according to the present invention includes not only a scanner, but also a device which can produce an image, such as a printer, a color copying machine, etc.

It should be noted that the image producing device according to this preferred embodiment may be implemented in the above described image processing unit 9 in a hardware manner, or as software driver in a software manner for cost reduction.

FIG. 35 is a block diagram showing the hardware configuration required when the processing according to this preferred embodiment is implemented by software.

In an information processing device 61 executing the software, a CPU 51, a ROM 52, a RAM 53, a communications interface 54, a storage device 57, a storage medium reading device 58, and an I/O interface 60 are interconnected by a bus 50. The CPU 51 expands the software, which is recorded in the storage device 57 such as a hard disk, etc. or onto a portable storage medium 59, in the RAM 53 via the storage medium reading device 58 and the bus 50, makes the software executable, and executes the software. Or, the software executing the processing according to this preferred embodiment may be recorded in the ROM, and the CPU 51 may execute the software by reading it via the bus 50.

At this time, a scanner, a copying machine, a printer, etc. is connected to the I/O interface 60. Also a monitor, a keyboard, a mouse, an input pen, a tablet, etc. are connected to the I/O interface 60 so as to input a user instruction or to notify a user of the proceeding status of a reverse-side visibility removal process.

Or, the software implementing the preferred embodiment may be downloaded and executed by making a connection to the database of an information provider 56 via a network 55 with the use of the communications interface 54 of the information processing device 61. Furthermore, the reverse-side visibility removal process may be performed on the information provider 56 side by recording the software in the database of the information provider 56, and by transmitting only image data to the information provider 56 via the communications interface 54 and the network 55.

As described above, the software can be stored in the ROM 52, the RAM 53, the storage device 57, the portable storage medium 59, or the database of the information provider 56. The storage media according to the present invention indicate at least these media.

According to the present invention, a background portion including a reverse-side visible portion can be detected regardless of the background color of an original document or the largeness/smallness of a reverse-side visible portion.

Then, the reverse-side visible portion can be removed without damaging the appearance of an image by replacing the detected background portion with a suitable background color.

What is claimed is:

1. An image production controlling device removing a reverse-side visible portion of input image data, and outputting the image data, comprising:

a histogram generating unit generating from image data a luminance value histogram for at least one color;

a most frequent value deciding unit deciding a luminance value having a highest frequency from the histogram; and a background candidate luminance area deciding unit deciding an area in the histogram, having a luminance value which will become a background candidate in a neighborhood of the luminance value having the highest frequency.

2. The image production controlling device according to claim 1, further comprising:

a background luminance value deciding unit deciding a luminance value to be background luminance within the area; and an image converting unit replacing a luminance value of the image data within the area with the luminance value to be the background luminance.

3. The image production controlling device according to claim 2, wherein the image data is a monochrome multi-valued image.

4. The image production controlling device according to claim 2, wherein the image data is a color image.

5. The image production controlling device according to claim 4, wherein the histogram is generated for each of luminance values of primary colors "R", "G", and "B" of each pixel.

6. The image production controlling device according to claim 2, wherein the luminance value to be the background luminance is a luminance value that gives a maximum frequency value, and is obtained by continuously scanning the area having the luminance value which will become the background candidate in a direction from the luminance value to be the background candidate toward a larger luminance value.

7. The image production controlling device according to claim 2, wherein the area having the luminance value which will become the background candidate is an area having a luminance value equal to or larger than a predetermined threshold value in the neighborhood of the luminance value having the highest frequency.

8. The image production controlling device according to claim 7, wherein
a plurality of threshold values are arranged, and a user can make a selection from among the plurality of threshold values depending on an image type.

9. The image production controlling device according to claim 2, wherein
the neighborhood of the luminance value having the highest frequency is a range from a luminance value which is smaller by a predetermined value than the luminance value giving the highest frequency, to a luminance value which is larger by the predetermined value than the luminance value giving the highest frequency.

10. The image production controlling device according to claim 9, wherein
a plurality of predetermined values are arranged, and a user can make a selection from among the plurality of predetermined values depending on an image type.

11. An image producing device removing a reverse-side visibility portion of input image data, and outputting the image data, comprising:
an image data capturing unit capturing image data; a first storing unit storing the captured image data;
a histogram generating unit generating a luminance value histogram for at least one color from the image data stored in said first storing unit;
a most frequent value deciding unit deciding a luminance value having a highest frequency from the histogram; and
a background candidate luminance area deciding unit deciding an area in the histogram, having a luminance value which will become a background candidate in a neighborhood of the luminance value having the highest frequency.

12. The image producing device according to claim 11, further comprising:
a background luminance value deciding unit deciding a luminance value to be background luminance;
an image converting unit replacing a luminance value of the image data within the area with the luminance value to be the background luminance;
a second storing unit storing the image data converted by said image converting unit; and
an outputting unit outputting the image data stored in said second storing unit.

13. An image production controlling method removing a reverse-side visible portion of input image data, and outputting the image data, comprising:
generating from image data a luminance value histogram for at least one color;
deciding a luminance value having a highest frequency from the histogram; and
deciding an area in the histogram, having a luminance value which will become a background candidate in a neighborhood of the luminance value having the highest frequency.

14. The image production controlling method according to claim 13, further comprising:
deciding a luminance value to be background luminance within the area; and replacing a luminance value of the image data within the area with the luminance value to be the background luminance.

15. The image production controlling method according to claim 14, wherein
the image data is a monochrome multi-valued image.

16. The image production controlling method according to claim 14, wherein
the image data is a color image.

17. The image production controlling method according to claim 16, wherein
the histogram is generated for each of luminance values of primary colors "R", "G", and "B" of each pixel.

18. The image production controlling method according to claim 14, wherein
the luminance value to be the background luminance is a luminance value that gives a maximum frequency value, and is obtained by continuously scanning the area having the luminance value which will become the background candidate in a direction from the luminance value to be the background candidate toward a larger luminance value.

19. The image production controlling method according to claim 14, wherein
the area having the luminance value which will become the background candidate is an area having a luminance value equal to or larger than a predetermined threshold value in the neighborhood of the luminance value having the highest frequency.

20. The image production controlling method according to claim 19, wherein
a plurality of threshold values are arranged, and a user can make a selection from among the plurality of threshold values depending on an image type.

21. The image production controlling method according to claim 14, wherein
the neighborhood of the luminance value having the highest frequency is a range from a luminance value which is smaller by a predetermined value than the luminance value giving the highest frequency, to a luminance value which is larger by the predetermined value than the luminance value giving the highest frequency.

22. The image production controlling method according to claim 21, wherein
a plurality of predetermined values are arranged, and a user can make a selection from among the plurality of predetermined values depending on an image type.

23. A computer-readable storage medium on which is recorded a program for causing a computer to execute a process removing a reverse-side visible portion of input image data, and outputting the image data, said process comprising:
generating from image data a luminance value histogram for at least one color;
deciding a luminance value having a highest frequency from the histogram; and
deciding an area in the histogram, having a luminance value which will become a background candidate in a neighborhood of the luminance value having the highest frequency.

24. The storage medium according to claim 23, further comprising:
deciding a luminance value to be background luminance within the area; and replacing a luminance value of the image data within the area with the luminance value to be the background luminance.

25. The storage medium according to claim 24, wherein the image data is a monochrome multi-valued image.

26. The storage medium according to claim 24, wherein the image data is a color image.

27. The storage medium according to claim 26, wherein the histogram is generated for each of luminance values of primary colors "R", "G", and "B" of each pixel.

28. The storage medium according to claim 24, wherein the luminance value to be the background luminance is a luminance value that gives a maximum frequency value, and is obtained by continuously scanning the area having the luminance value which will become the background candidate in a direction from the luminance value to be the background candidate toward a larger luminance value.

29. The storage medium according to claim 24, wherein the area having the luminance value which will become the background candidate is an area having a luminance value equal to or larger than a predetermined threshold value in the neighborhood of the luminance value having the highest frequency.

30. The storage medium according to claim 29, wherein a plurality of threshold values are arranged, and a user can make a selection from among the plurality of threshold values depending on an image type.

31. The storage medium according to claim 24, wherein the neighborhood of the luminance value having the highest frequency is a range from a luminance value which is smaller by a predetermined value than the luminance value giving the highest frequency, to a luminance value which is larger by the predetermined value than the luminance value giving the highest frequency.

32. The storage medium according to claim 31, wherein a plurality of predetermined values are arranged, and a user can make a selection from among the plurality of predetermined values depending on an image type.

* * * * *